(12) United States Patent
Luckenbaugh et al.

(10) Patent No.: US 6,311,269 B2
(45) Date of Patent: *Oct. 30, 2001

(54) TRUSTED SERVICES BROKER FOR WEB PAGE FINE-GRAINED SECURITY LABELING

(75) Inventors: Gary L. Luckenbaugh; Forrest E. Stoakes, both of Gaithersburg, MD (US)

(73) Assignee: Lockheed Martin Corporation, Bethesda, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,612

(22) Filed: Jun. 15, 1998

(51) Int. Cl.[7] ..................................................... G06F 13/14
(52) U.S. Cl. ............................................................. 713/154
(58) Field of Search ................................... 713/154, 160, 713/182, 201

(56) References Cited

U.S. PATENT DOCUMENTS

| 5,375,244 | 12/1994 | McNair . |
| 5,416,842 | 5/1995 | Aziz . |
| 5,550,984 | 8/1996 | Gelb . |
| 5,590,199 | 12/1996 | Krajewski, Jr. et al. . |
| 5,602,918 | 2/1997 | Chen et al. . |
| 5,606,668 | 2/1997 | Shwed . |
| 5,623,601 | 4/1997 | Vu . |
| 5,623,656 | 4/1997 | Lyons . |
| 5,638,446 | 6/1997 | Rubin . |
| 5,657,390 | 8/1997 | Elgamal et al. . |
| 5,862,325 | * 1/1999 | Reed et al. ......................... 395/200.31 |
| 5,875,296 | * 2/1999 | Shi et al. ............................ 395/188.01 |
| 5,889,958 | * 3/1999 | Willens ............................. 395/200.59 |
| 5,940,591 | * 4/1999 | Boyle et al. ....................... 395/187.01 |
| 5,961,601 | * 10/1999 | Iyengar .................................... 709/229 |
| 6,006,228 | * 12/1999 | McCollum et al. ...................... 707/9 |
| 6,041,357 | * 3/2000 | Kunzelman et al. .................. 709/228 |
| 6,049,877 | * 4/2000 | White ..................................... 713/201 |
| 6,052,785 | * 4/2000 | Lin et al. ............................... 713/201 |

* cited by examiner

Primary Examiner—Tod Swann
Assistant Examiner—Matthew Smithers
(74) Attorney, Agent, or Firm—McGuireWoods, LLP

(57) ABSTRACT

Arbitrarily fine-grained limitation of access to information stored in a resource of a data processor network is provided in a manner compatible with existing network browsers by mapping user identity and credentials with randomly assigned security cookie information which thus serves as a surrogate credential accompanying each user request during a session. Labels are imbedded within HTML files/text which may embody any desired security policy, including mandatory access control (MAC) arrangements which are not available through native browser functions. Data is retrieved in response to a user request which includes a security cookie from a location in the resource which is not directly accessible through use of a URL; the location being stored in a configuration file which is hidden from users. The retrieved data is then filtered in accordance with labels provided for each page and/or embedded in the text and used to build a response which may include hypertext links or other user interfaces for transmission to the user. Provision is made for viewing or changing of labels, credentials and passwords.

17 Claims, 19 Drawing Sheets

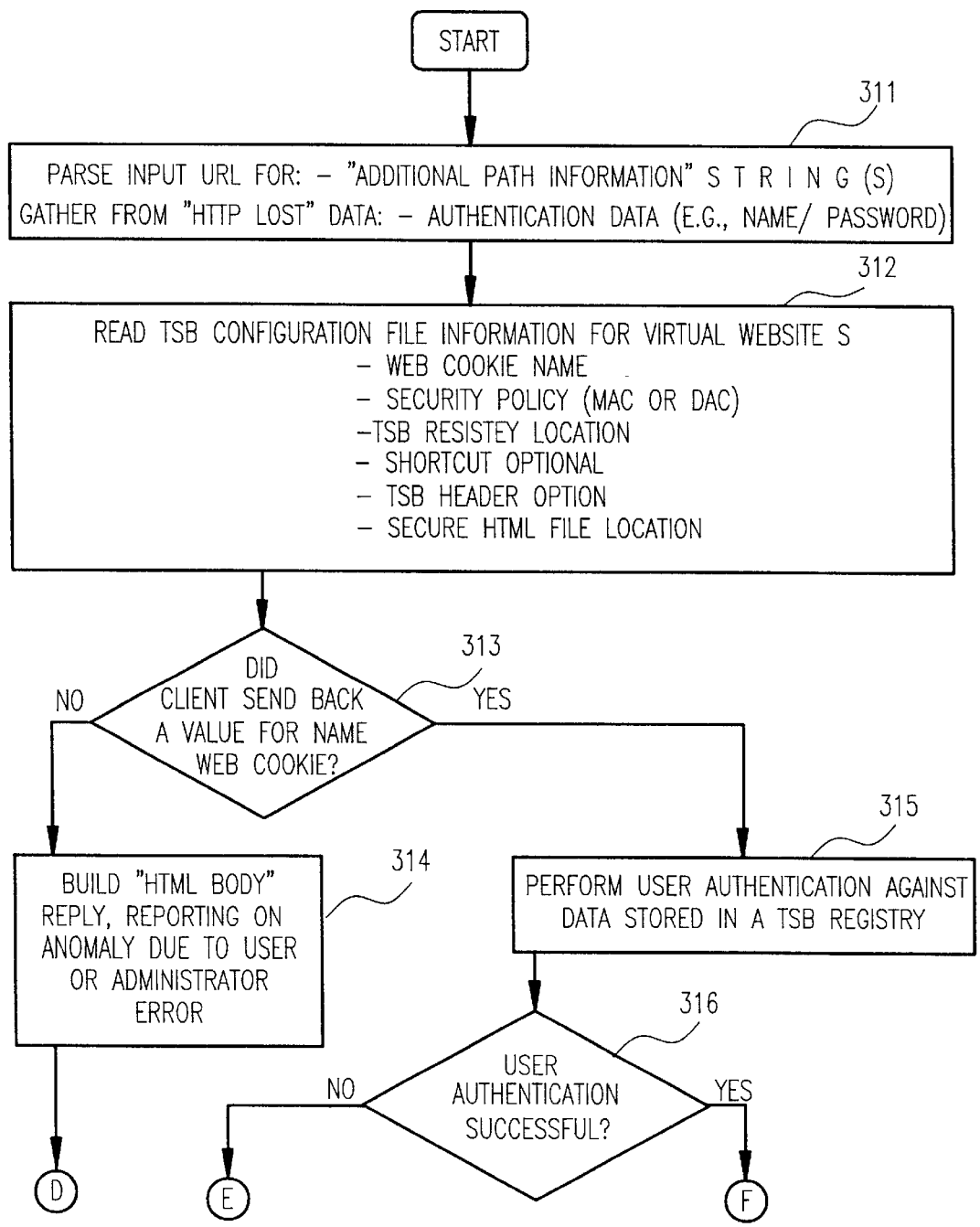
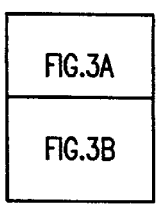
FIG.3A
FIG.3

TRUSTED SERVICES BROKER FOR WEB PAGE FINE-GRAINED SECURITY LABELING

BACKGROUND OF THE INVENTION

1. Field of the Invention

The present invention generally relates to computer networks including shared resources and, more particularly, to computer networks selectively providing access to information to a plurality of users through a web browser/server interface in accordance with user credentials.

2. Description of the Prior Art

With the growing familiarity and ubiquity of the Internet and World Wide Web for exchange of information, similarly styled and functioning information exchange systems are being provided on more or less private intranet (e.g. within a business or organization) and extranet (among a select group of cooperating businesses or organizations) network systems for exchange of data among, for example, employees of an organization or company connected thereto. The familiarity of users with internet browsers enhances their efficiency and comfort with using systems which operate similarly and provide similar interfaces in intranet and extranet communication systems in their workplaces.

Such systems can employ firewalls, virtual private network technology, or other technologies to limit access to computing resources to some subset of users, and thus completely deny access to others. On the other hand, some computing resources are openly contactable by nearly everyone in an enterprise. In either case, there can be scenarios where only a subset of people who can contact a resource should be capable of accessing the information provided by the resource. This is true even of a situation where firewalls exist to create enclaves of users that have exclusive access to resources within their respective enclaves, because a resource may have to be placed in a common area so that selected individuals from multiple enclaves get appropriate access.

When the computing resource is web information, most web servers provide for this additional security need by enforcing a user authentication, establishing a Discretionary Access Control (DAC) credential for the user, such as a group or a role, and then performing access control on HTML requests at either the directory or file level. However, there are situations where organizations either need specialized web data access using Mandatory Access Control (MAC) which assigns data both classifications and compartments, or where organizations require that portions of individual HTML files be labeled such that only certain users see certain portions of the file. Such capabilities are not supported by native web server security. Nor are they supported by other industry products that typically install middleware on clients and servers as the basis for the digital certificate or Kerberos ticket exchanges, so as to perform authentication and enforce access control to web and non-web network resources. For example, such products still provide a DAC access control mechanism, and any fine-grained labeling of objects is supported to a file level or data base record level, but labeling is not applied internally of ASCII files, such as static HTML pages.

Several concepts are involved in known Internet, intranet and extranet arrangements which are exploited in a modified and enhanced form in the invention, known forms of which will now be discussed. A first concept is that of the Common Gateway Interface (CGI) and a second concept is that of the "cookie".

In regard to known CGIs, most web page access is performed using a so-called simple URL (an acronym for Universal Resource Locator) of the form "http://domain.com/dir/pag.html".

This directs the web server, also known as the "httpd server", managing the web site domain "domain.com" to retrieve the static HTML page "pag.html" from a directory called "dir" that is, itself, a subdirectory of a single and well-known directory on the web server.

In contrast, a generalized URL invoking a CGI interface directs the web server to invoke another program, a CGI program, which builds the contents of the HTML page to be presented to the user in accordance with parameters provided in a generalized URL (hereinafter sometimes "CGI URL" to indicate this function in the context of the invention). Essentially a CGI program is a stateless interface which executes, when invoked and utilizing parameters provided in the "CGI URL", to provide a single service to the network user. Generalized URLs for performing such a function are more complex and of the form "http://domain.com/cgi-bin/program/extrapath/parm1=value1&parmN=valueN". Such a URL tells the web server to execute the CGI program "program", providing additional path information as specified by "extrapath" and providing any desired number of parameter values (e.g. parm1 and parmN) to the CGI program. The CGI program then executes and provides the result, in HTML format, which the browser can interpret and display.

The concept of a "cookie" is an incident of the fact that CGI programs are stateless interfaces performing the function of building a response each time invoked and, while uses of the CGI program may be logged, the result of the use is not. Generally the "cookie" facility allows the CGI program to maintain state for a browser session. The CGI is free to assign whatever kind of state it wants to a cookie value it assigns to a browser and could be considered as providing browser session identity (but not necessarily user identity).

A "cookie" name and value get assigned to a browser for a specific web server domain. This occurs when a CGI script assigns a cookie name and value into the Hypertext Transfer Protocol (HTTP) header portion of the HTML reply that is sent back to the browser. The cookie name and value are then echoed back to the web server at the identified domain whenever the browser issues another HTTP request to the web server. Thus, the cookie name and value are present at both the web browser and web server. The server can continue to set different values, or set new cookie names, as it desires. This cookie data thus provides a means of having the web server maintain and recognize state information across multiple client requests. Cookies are also assigned lifetimes by the web server; if finite, the cookie name and value are stored in a disk file at the browser, tied to the domain name. If no expiration is specified, cookies only live in browser memory (but not on disk), and are in effect for only as long as the browser is not terminated.

A "cookie" value is assigned by a CGI script and is unique to the domain. As is known in the art, the "cookie" is a passive (in at least the sense that the user has no control over its content) group of data, generally randomly assigned and may be stored in a file at the user's browser (in connection with assignment of a lifetime parameter). The "cookie" value, once assigned, can then be sent to the client browser by the web server. The client browser then returns it with each transaction requested during the session. Thus, the cookie is available at both the domain and the web server for each transaction in the session and can associate the transactions in the session with a particular domain.

It should be noted that neither CGI programs nor cookies, as presently known and used in the art, have any security implications. The cookie merely allows a web server to, at most, infer information about what occurred on previous transactions from the browser. Strictly speaking, even this is not necessarily true, if a user alters the cookie value as stored in the disk cookie file. Such an act does not actually defeat or "spoof" security aspects of the server, although it can make the web server act differently. In fact, cookie names and values can never be used as the basis for providing security features, unless they are utterly hidden from users, to prevent cookie inspection or alteration.

SUMMARY OF THE INVENTION

It is therefore an object of the present invention to provide a web server "filtering" security service that is flexible in regard to the underlying access control policy, and is finegrained in the sense that specific portions of static HTML files may be labeled such that the filtering will excise the data upon return to the browser if the user is not authorized to see the data in accordance with that label.

It is another object of the invention to provide the service by limiting installation of invention items to web server machines, avoiding the need to install anything on web browser clients.

It is a further object of the invention to provide, in a manner transparent to a user (subsequent to entry and acceptance of the user's credentials), access to information which is filtered for presentation to the user in accordance with access authorizations corresponding to the user.

It is yet another object of the invention to provide a convenient arrangement for changing credentials, viewing and changing of fine-grained labels, changing of passwords and ensuring a logout function.

It is another further object of the invention to enhance known web server functions by supporting user authentication through CGI scripts, to map MAC and DAC credentials to users, embed security labels within HTML files and provide for changes of password, labels, credentials, MAC ranges and/or DAC role lists.

In order to accomplish these and other objects of the invention, a method of limiting access to information stored in HTML files accessible by a web server through a CGI script, in which the information includes HTML label structures recognizable by the CGI script, is provided which comprising the steps of dynamically storing at a web server a mapping of a web cookie value to user credentials retrieved from CGI accessible registry storage, to thereby establish the web cookie as a security cookie in the mapping, creating a set of the credentials by prompting a user for for authentication information, validating the authentication information against user information retrieved from the CGI accessible registry storage in response to a request for retrieval of a stored HTML file that was not accompanied by a web cookie name and value contained within said mapping, retrieving the stored HTML file in response to a request from a user accompanied by said security cookie value, filtering the stored HTML file in accordance with the user credentials associated with the security cookie value to form filtered information in accordance with the HTML label structures, and returning the filtered information to the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
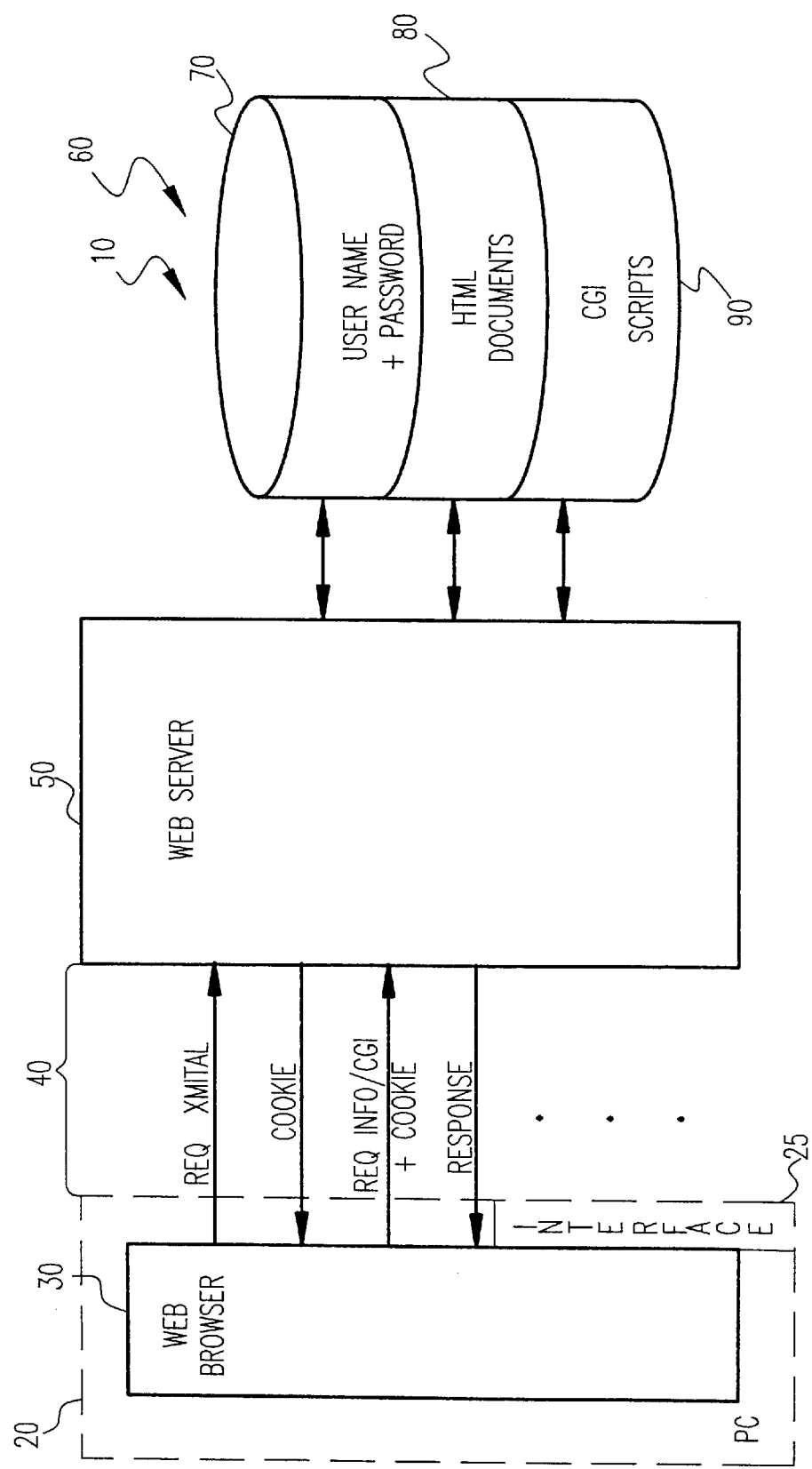
FIG. 1 is a high-level block diagram of the system architecture of known Internet-style communication arrangements which is also employed in the invention.

Referring now to the drawings, and more particularly to FIG. 1, there is shown a high-level schematic diagram of the architecture 10 of a network system such as is found in internet, intranet and extranet applications. This portion of the system architecture will also be found in FIGS. 4, 9 and 13 which are illustrative of the architecture of the invention and operations performed therein in accordance with the invention. Accordingly, the architecture of FIG. 1 will also be common to the architecture of a portion of the invention but, in regard to the invention, the content of data routed therethrough will be characteristically different from that commonly used in the art. Further, FIG. 1 is arranged to facilitate an understanding of the invention and the compatibility of the invention with currently known systems. Accordingly, no portion of FIG. 1 is admitted to be prior art as to the present invention beyond the description of the operation of known systems which immediately follows.

Specifically, in known systems a computer 20, such as a personal computer (PC), will contain a web browser 30 of a type and configuration which is not important to the practice of the invention. The web browser 30 handles communications with a web server and cooperates with the computer 20 to present a display and other aspects of the network interface to the user. The computer 20 will also include some form of interface 25 to a communication link or network 40. A modem would, for example, be an appropriate interface to a network communicating over telephone lines or other audio links.

The communication link 40 will enable communication of the web browser 30 with the web server or server 50 which will thus respond to user inquiries or other control functions communicated from the interface to the web server 50 by the browser 30. The web server 50 will communicate with its storage (possibly including relational database interfaces to other machines through its CGI scripts) to assemble a response to be returned to the browser 30.

A typical session using the architecture of FIG. 1 will begin with the establishment of a network link 40 and the transmittal of a request to the web server 50. This may include a communication protocol which may include a plurality of bidirectional transmissions including processing of a user name and password as stored at memory 70 over link 40. When the link is established, a web server may choose to set, or transfer, a "cookie" to the browser, and may in fact continually perform such "cookie" setting operations with different values as the session proceeds. As alluded to above, the "cookie" allows results of independent transactions which are part of the same user session to be associated into a larger session transaction. Individual purchases placed into a "virtual shopping cart" would be an example of such a session transaction; the "cookie" associating the independent transactions and allowing an aggregate summation or totalization of the session transaction to be done.

Once the link has become established, one or more requests for information to retrieve HTML documents 80 or execution of CGI programs 90 to build such pages may be sent, serviced and the results returned in HTML format for display to the user at computer 20 in the course of a session. The results may be aggregated in accordance with the "cookie" as alluded to above, if the server has chosen to use cookies. The session transaction, as tied together by the cookie, terminates once the client is no longer capable of transmitting the cookie value to the web server on each individual transaction.

This termination can occur in two ways depending on the establishment of an expiration for the cookie by the web server. First, if there is no cookie expiration established by the web server, the cookie is not permanently stored at the client; once the web browser is terminated, the cookie and, hence, the session are lost. Second, if there is a cookie expiration established by the web server, the cookie and expiration time are stored on the web browser machine's disk. The session transaction thus holds across multiple transactions and invocations and terminations of the web browser until the expiration time is reached.

By way of introduction to the invention with the foregoing as background, the invention provides significant enhancements to and different functionality of both the "cookie" and CGI interfaces, as described above. Specifically, the key to the solution of the problems of providing fine-grained security while maintaining full compatibility with present systems is provided in accordance with the invention by ensuring that each web server is properly configured to exercise the function of a trusted services broker (TSB) for the smallest divisions of data and the most subtle distinctions in access authorization that may be desired.

The solution provided by the invention is implemented via CGI scripts under the control of configuration data which is maintained by a trusted administrator. Two parameters within the configuration data, document location and cookie name, are particularly important and will be discussed in detail below. In practice, however, a preferred form of the invention allows, as a perfecting feature, for one web server to manage several "virtual web sites", each with its own unique configuration and behavior. The CGI scripts implementing the invention determine which virtual web site is being addressed by a client via the "extrapath" information that is part of the incoming URL. There is a separate configuration file for each "virtual web site" supported, accessed according to the string value supplied in "extrapath". Multiple virtual web sites can be used to allow for one web server to support two different security needs without the necessity of running multiple servers. Alternatively, this capability allows support of a virtual web site for demonstration or diagnostic purposes.

Regardless of whether one or multiple web sites are supported, the two most important fields within any configuration file are:

1. Document location—This information is provided in, for example, a look-up table format and names another directory on the web server machine where the desired document is located in secured HTML files. By storing in a unique location, users cannot use a simple URL for retrieving a secured web page, including any security labels it may contain. Security can thus not be bypassed using a simple URL since the web server will look only in its own "well-known repository" of unsecured HTML pages in response to a simple URL. The provision for a unique location for secured HTML pages also separates them from other virtual web sites on the server which may label data differently in different directories.

2. Cookie name—The basis for forcing user authentication and then binding a browser session to a user identity and associated credentials is the web "cookie" mechanism. Each virtual web site must use a unique "cookie" name. Standard web browsers support a "cookie file" in which cookie values are assigned to cookie names for a particular domain when web servers perform a special "set cookie" action. Once a cookie has been set, the browser sends it and any other cookie it may have for this web server's domain at each URL request.

Since the invention uses the value of the cookie as a means for mapping user identity and credentials to that value, the cookie is thus effectively a surrogate credential for the user in regard to the document locations which may be accessed. The "cookie" as employed in the invention will hereinafter be referred to as a "security cookie" to indicate the surrogate credential function and to differentiate the "cookie" as utilized in the invention from the functionality of "cookies" as previously known and used, even though the security cookie can be accommodated by known systems.

Incidentally, it should be understood that the invention as will be as described below is inconsistent with one common HTML feature known as "framing". Therefore, the following discussion assumes that no HTML "frame" statements are contained in the static information to which security labels are to be applied in accordance with the invention.

The preferred embodiment of the invention employs nine "security CGI programs" (sometimes referred to hereinafter as "security CGIs"; the term "security CGI" being used to differentiate the functions of the CGI scripts which support the functions of the invention from the arbitrary CGI scripts which may be programmed to perform arbitrary desired servicing of user requests). These nine security CGIs collectively constitute a "trusted services broker" as applied to web HTML data and, for reference, are denoted and discussed below as Getpage, Authenticate, View Credentials, Change Credentials, View Label, Change Label, Change Password, Password Form and Logout. These security CGIs will be discussed in turn in connection with FIGS. 2, 3, 5, 6, 7, 8, 10, 11 and 12, respectively, and in relevant combinations in connection with FIGS. 4, 9 and 13, respectively.

Figure 2A:
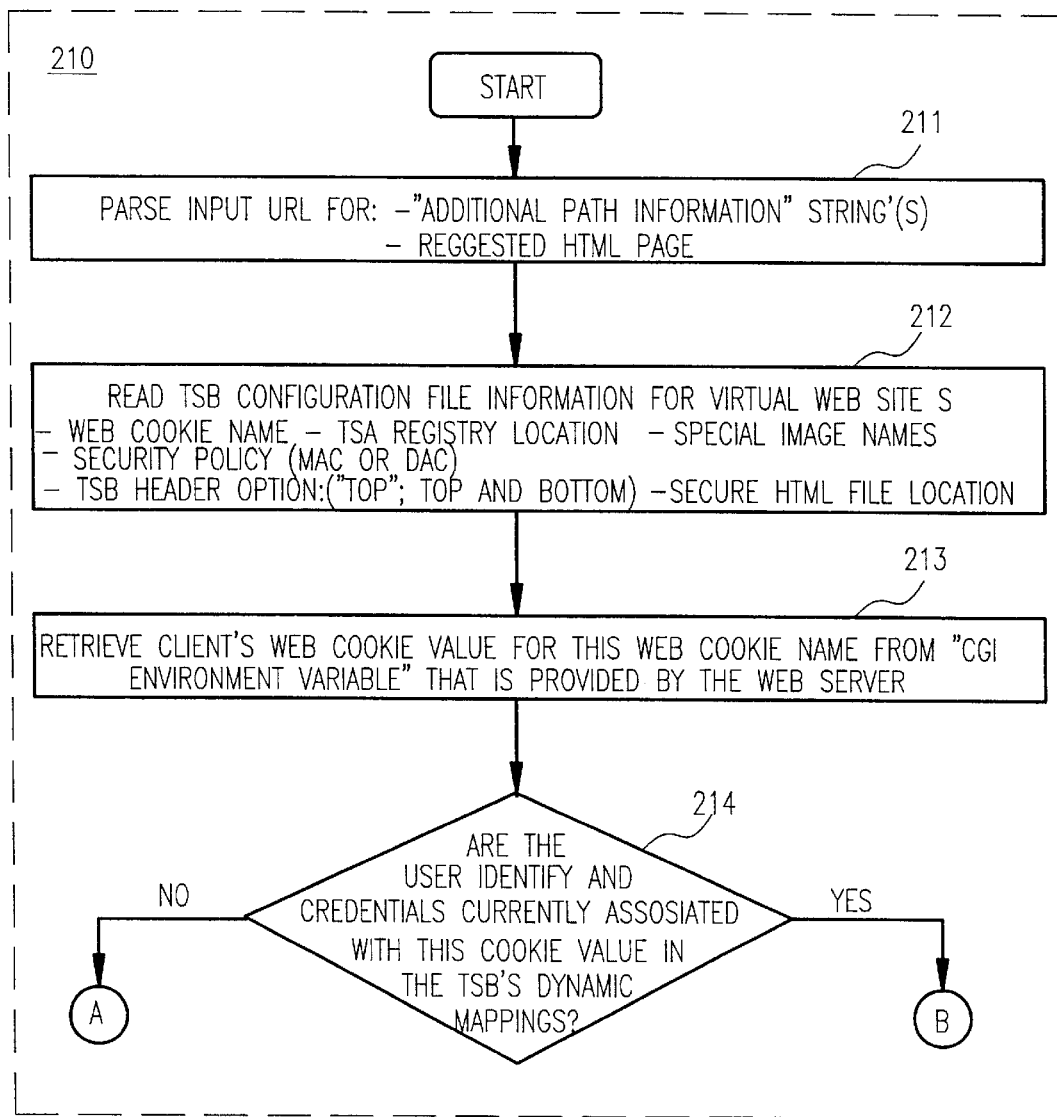
FIG. 2 is a flow chart/high-level block diagram of the Getpage function in accordance with the invention.
Figure 2:
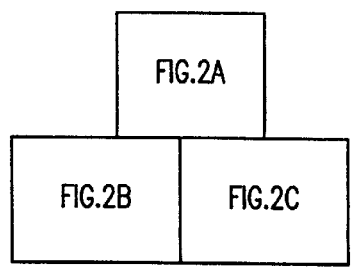
Figure 2B:
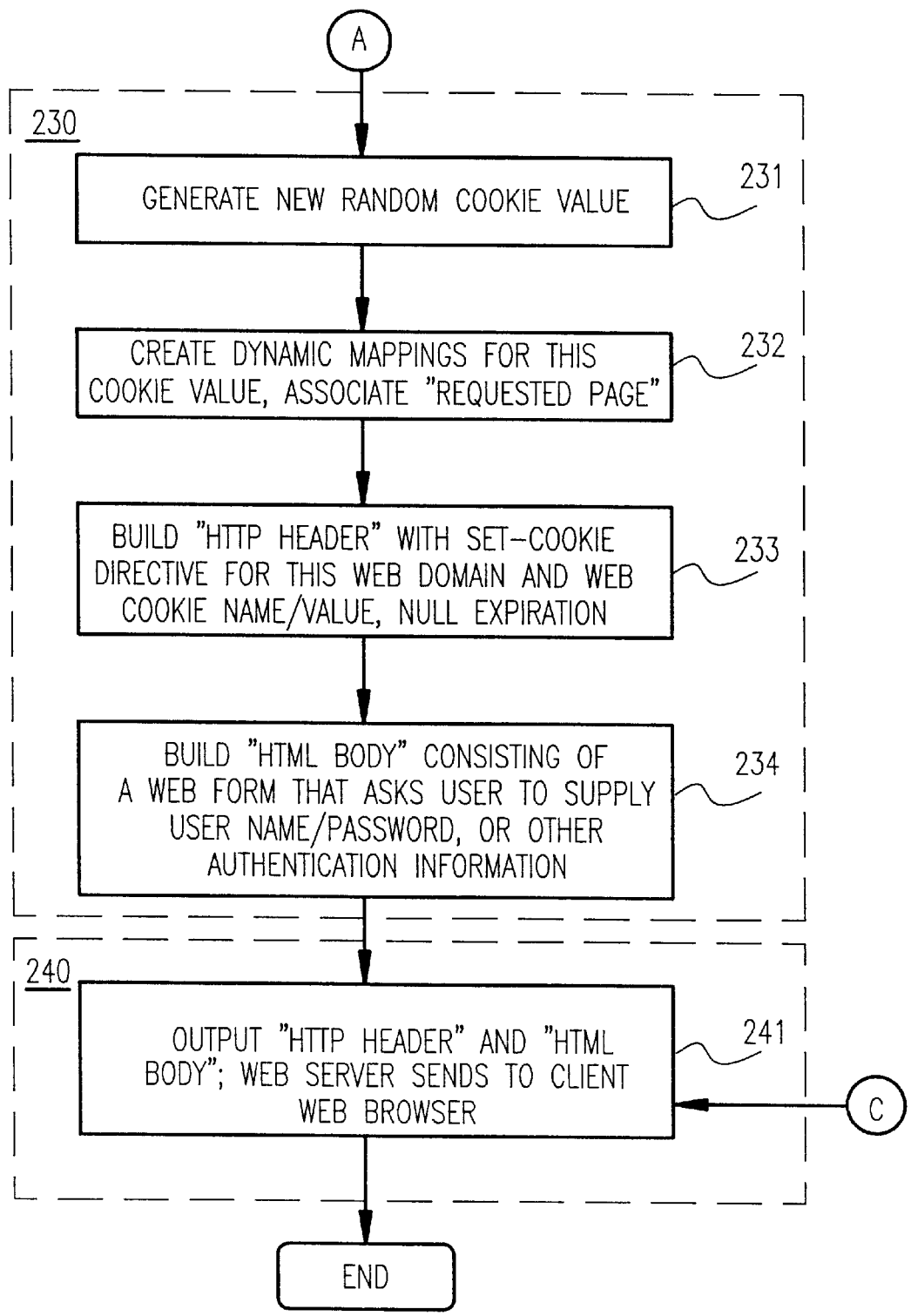
Figure 2C:
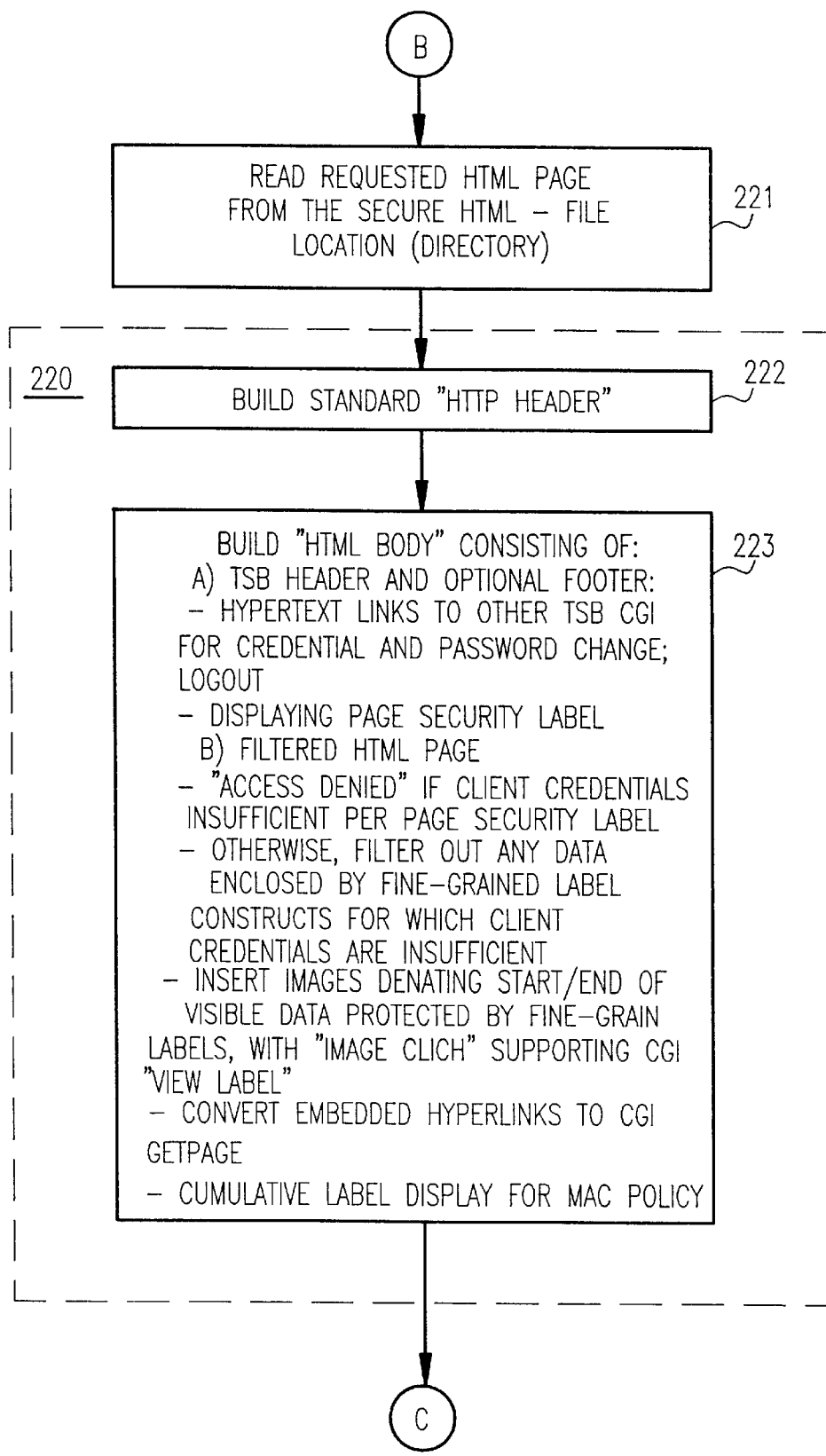
Figure 3B:
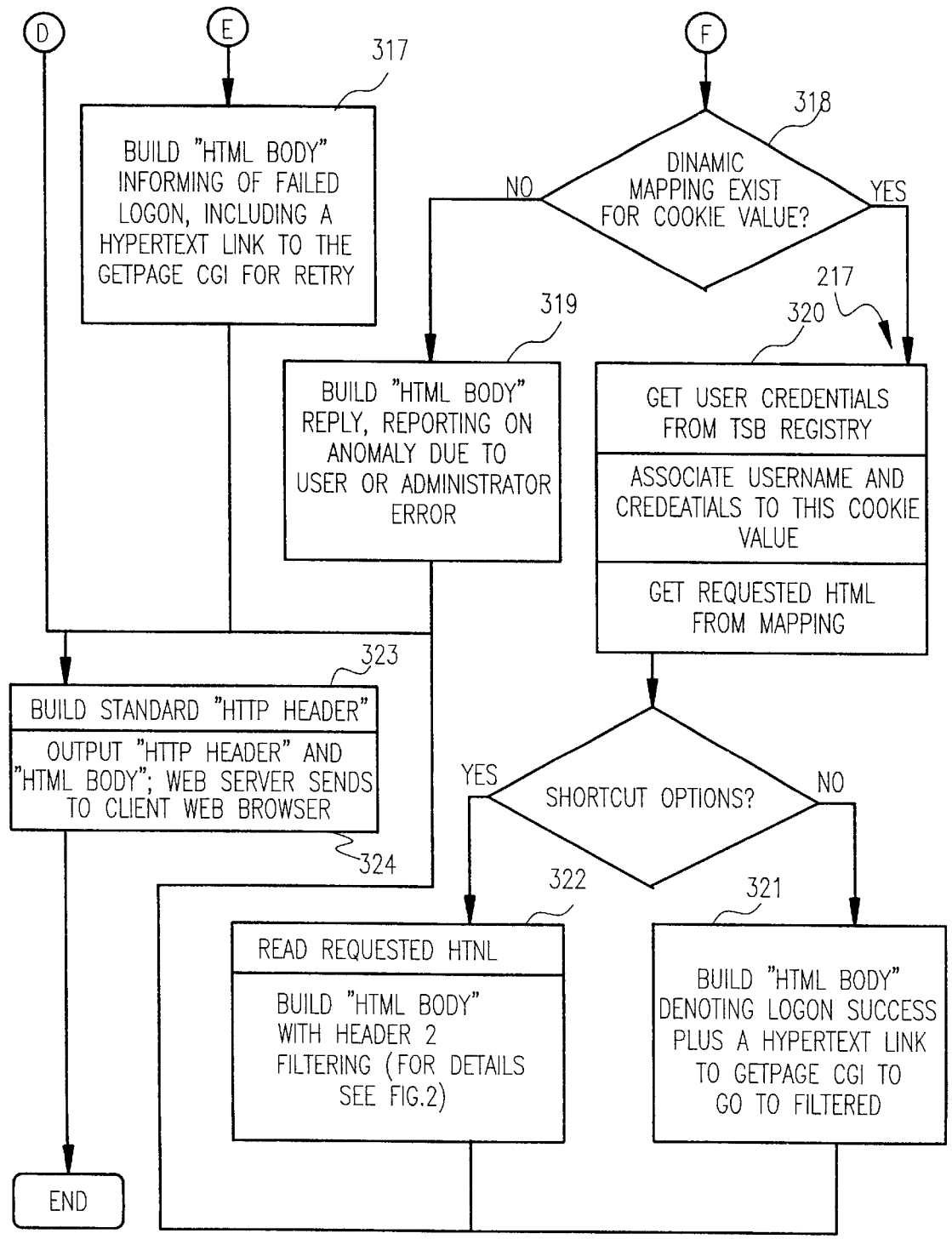
FIG. 3 is a flow chart/high-level block diagram of the Authenticate function in accordance with the invention.
Figure 4:
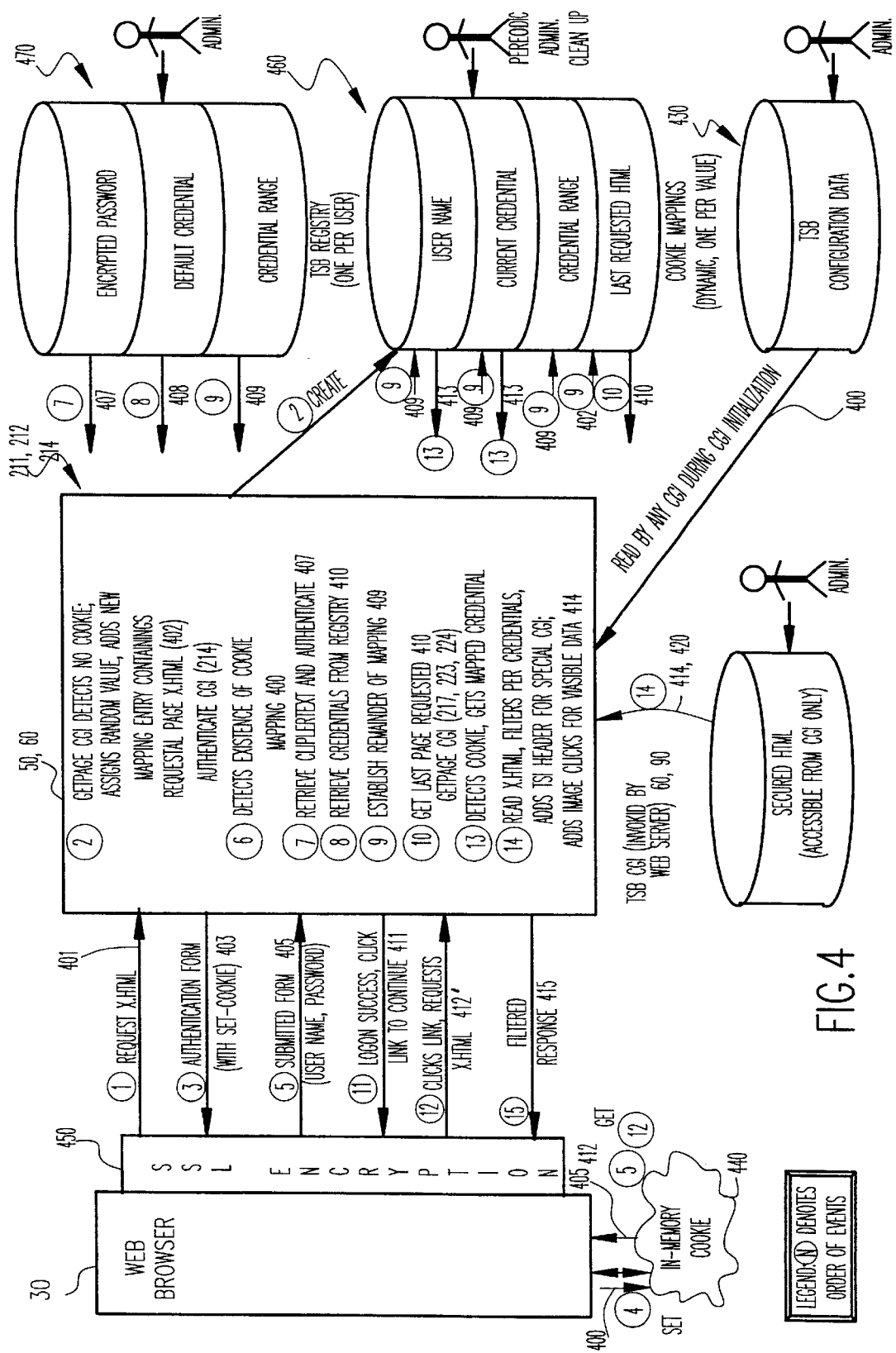
FIG. 4 illustrates the architecture of the invention, including the subject matter of FIG. 1 and showing the data flow for authentication and page filtering and including the Getpage and Authentication functions of FIGS. 2 and 3, respectively.

Referring now to FIGS. 2, 3 and 4, the Getpage security CGI illustrated in FIG. 2 is divided into four phases: the first phase 210, including steps 211, 212, 213 and 214, provides preliminary support for determining whether the user is already in possession of a security cookie. The second phase 220, including steps 221, 222 and 223, constitutes the security filter function which is the main task of the web server trusted services broker (TSB). A third phase 230, including steps 231, 232, 233 and 234, provides the setup for providing a user authentication, and a fourth phase 240, comprising step 241 is a final step common to either phase 220 or 230.

The first phase 210 determines if the client has a security cookie and, if so, provides for the creation and necessary manipulations of the security cookie "surrogate credential" into an actual credential such as a user or group identity. The creation of the actual credential from the security cookie provides discrimination in regard to access authorization to whatever degree may be desired. The second phase 220 retrieves the desired information and assembles the HTML page to be returned to the user, taking account of comparisons of security labels which may be freely embedded in the data in comparison with the actual credentials derived from the security cookie to filter the information in a fine-grained manner. In this latter regard, as will be discussed in greater detail below, the particular HTML page assembled and transmitted on any particular execution of the Getpage CGI script depends on the credential values derived from the security cookie. The third phase 230 prepares for a new user authentication described below.

Figure 9:
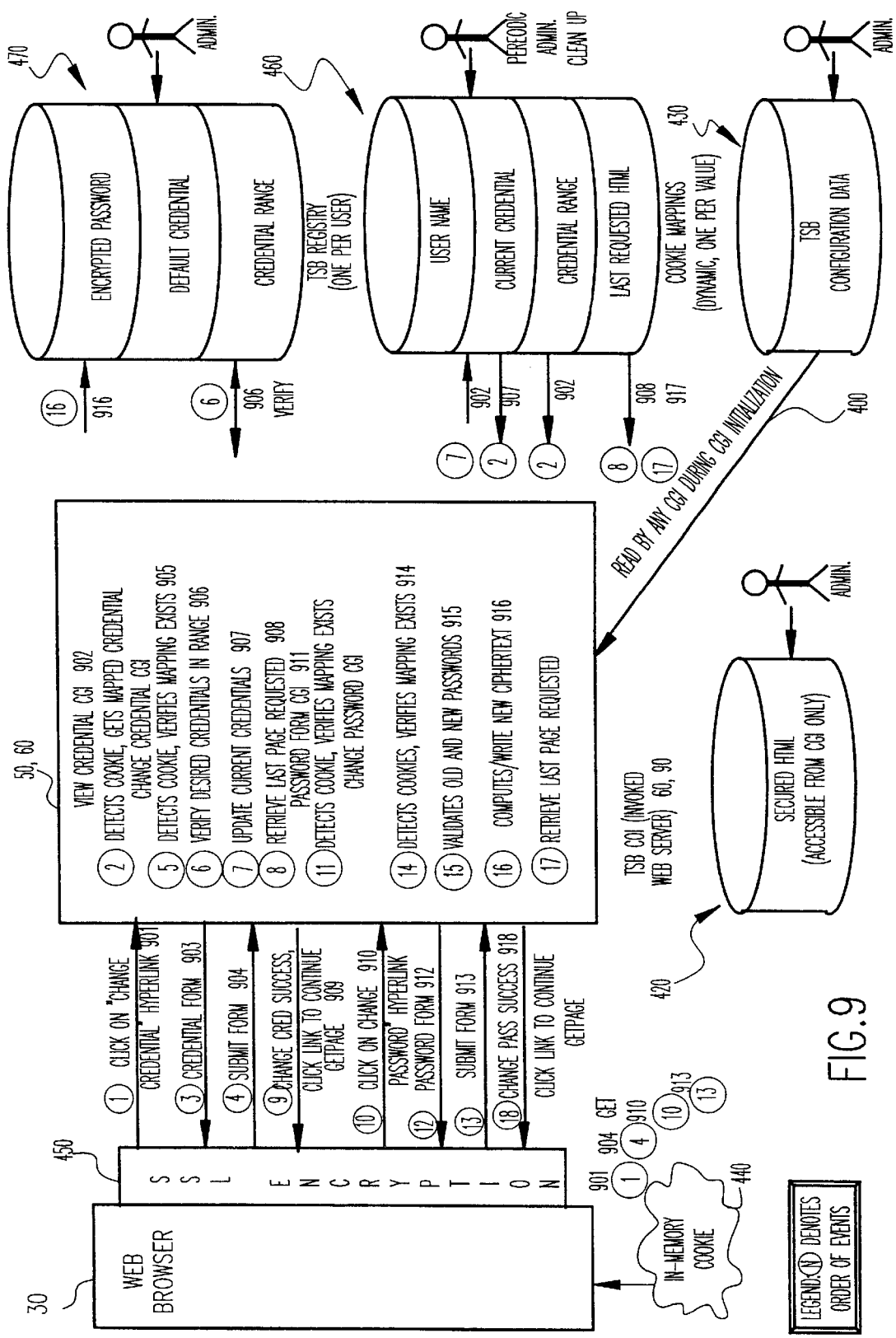
FIG. 9 illustrates the architecture of the invention, as also shown in FIG. 4 and showing the data flow for credential/Password operations and including the View Credentials, Change Credentials, password form and change password functions of FIGS. 5, 6, 7 and 8, respectively.
Figure 13:
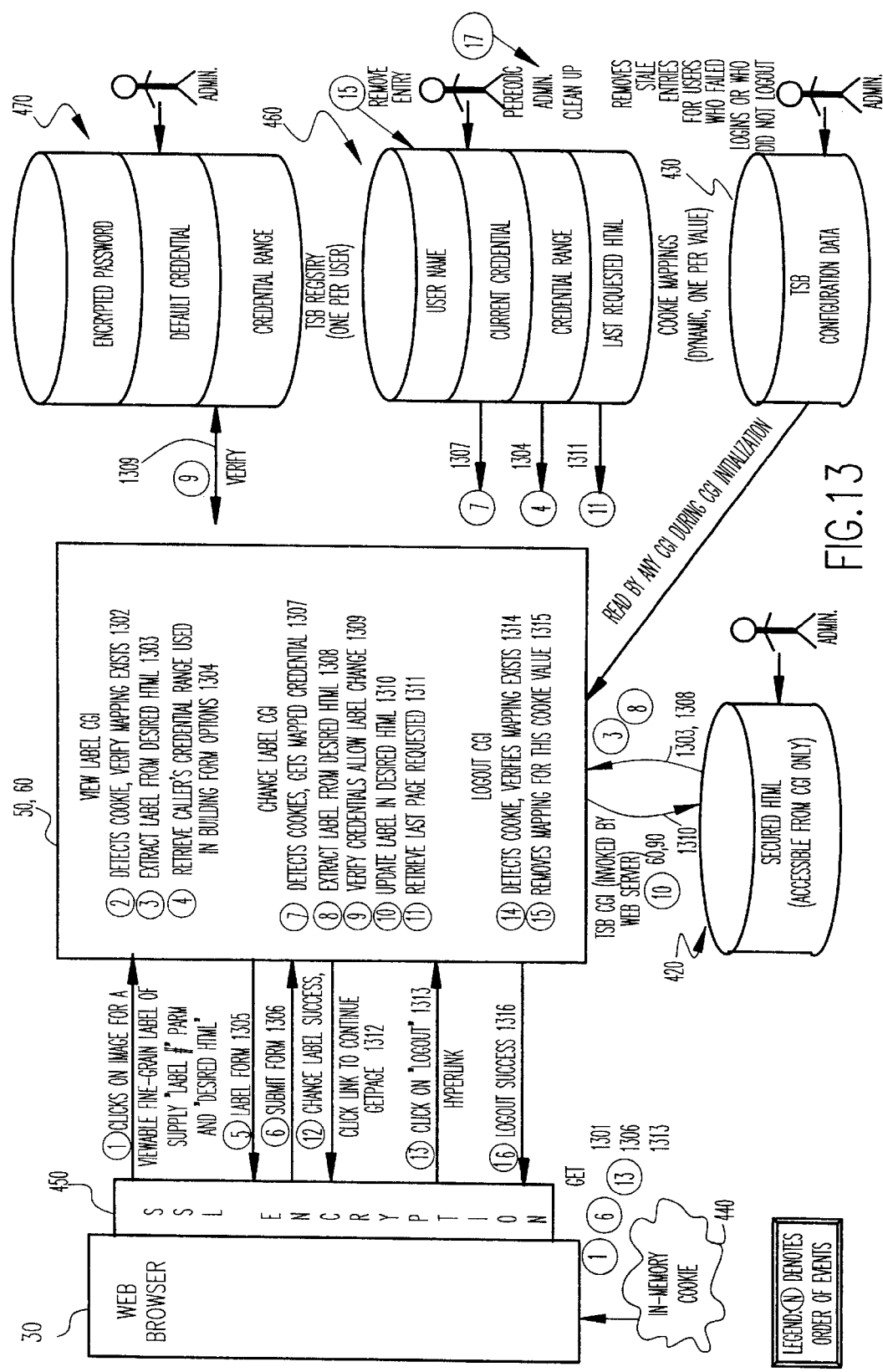
FIG. 13 illustrates the architecture of the invention, as also shown in FIG. 4 and showing the data flow for authentication and page filtering and including the Label and Logout operations functions of FIGS. 10, 11 and 12, respectively.

Before proceeding to a detailed discussion of FIGS. 2 and 3, it should be noted that the data flow diagrams represented by FIGS. 4, 9, and 13 differ from the arrangement illustrated in FIG. 1 in one facet. Although these three data flows are of a lower, more detailed level than FIG. 1, the functions of the web server and CGI logic as denoted by numbers 50 and 90 in FIG. 1 are merged into one box in these more detailed descriptions, because the native web server functions simply serve as a middleman module between the CGI scripts and the web browser.

Dynamic storage (also subject to administrator control) of cookie mappings including user names, current credential, credential range and the last requested HTML page is provided in storage 460. It should be noted that the "credential range" stored under both 460 and 470 contain the same information. The reason for the duplication is that once a user is authenticated, the desire is to no longer reference this information directly from the TSB Registry 470 but rather from the cookie mappings 460. TSB configuration data is stored at 430 and is read by any CGI script during initialization and contains the locations of secured HTML pages or other articulations of secured data stored at 420. The location of secured data are accessible only through CGI scripts.

The web browser 30 potentially differs from that shown in FIG. 1 by providing for storage of the user's cookie for the current session. A preferred embodiment of the invention assigns no lifetime to the cookie, so that the cookie is only stored in the web browser memory, and not on disk. Not only does this better protect the sensitive values of the "security cookie", it makes it impossible for the browser to be restarted and automatically already have its credentials established with the web server. It is also preferred to provide a Secure Socket Layer (SSL) encryption 450 as part of the web browser interface to prevent theft of a valid cookie by a "network sniffer". As will be described below, a Logout security CGI is also provided to limit duration of the existence of each valid cookie to that of a session. Therefore, periodic destruction of active cookies through web server administrative action is limited to sessions in which the user has neglected to Logout.

Specifically, as shown in the flowcharts represented by FIGS. 2 and 3, both the Getpage and Authenticate functions begin with parsing the input URL to detect inputs from the browser, as illustrated in 211, 311. The "additional path information", or "extrapath" part of the URL denotes which configuration data file is to be accessed by the CGI for knowing the cookie name, HTML document location, and other processing parameters such as security policy (e.g. MAC or DAC), the location of the registry, and other flags that affect detailed processing (212, 312). The Getpage function additionally gets the requested HTML page from the parameter list portion of the URL (211). The Authenticate function receives authentication information such as username and password as typed by the user doing a logon, by virtue of the web form passing the data via the HTTP POST protocol instead of using the URL parameter list, so as to better hide this sensitive authentication data 311).

Additional fields obtained from the configuration data, as shown in 212 and 312, have the following meanings. For the Getpage function, the TSB header option determines whether the additional hypertext links in support of changing credentials or password, or logging out, appear exclusively at the top and/or partially at the bottom or other portion of the format of the user interface or display. The special image names denote additional graphics files to display at the top and bottom of the HTML if specific registry controls have been enabled. Neither of these features is particularly important to the invention, and could be omitted without significant drawbacks. For the Authenticate function, a "shortcut" option dictates whether, upon a successful authentication, the browser is given a reply that denotes the success, but to which a user must click a hypertext link to get the originally requested and filtered HTML page, or whether upon success the requested and filtered page is returned immediately, without the intermediate reply. Although the shortcut is often viewed as a convenience and as having better human factors, it also could be omitted without departing from the principles of the invention.

The Getpage function of FIG. 2 continues with retrieval of any cookies it was sent. In a CGI, this is performed by reading an environment variable that the native web server sets (213). Cookies are provided in the form of name=value. Step 214 determines if any of these cookies has a "name" that matches the name denoted by the configuration file. If so, the "value" is used as a lookup key to see if the server already has mapped credential information to it (FIG. 4, item 460). If this is also so, then control is passed to item 221 to perform the basic document filtering function. If either condition is not met, an authentication is necessary before attempting to send back filtered HTML pages, hence control is passed to step 231.

If an authentication is needed, step 231 assigns a new random value to the client and the requested HTML page name is mapped to this value for later retrieval, as illustrated at 232. Then, in steps 233 and 234, a "web form" is built for transmission (241) to the client that requests user identification data (e.g. user name and password). In addition, the HTTP header of this transaction is supplied a "set cookie" directive so that the browser echoes back this particular cookie value on all subsequent requests. This cookie value is only valid during the current browser session and disappears when the browser is terminated. When the "web form" is submitted, the Authenticate function (as illustrated in FIG. 3) is invoked through a corresponding CGI script in accordance with the invention.

It should be understood that the cookie thus set is necessary to carry out the Authentication CGI script and access to secured data will not be granted unless the Authentication process is successful. If the Authentication process is successful, the cookie is established as a security cookie through having the CGI script map the user identity and credentials to the cookie value. This mapping establishes the security cookie as a surrogate credential.

Referring now to FIG. 3 and assuming that steps 311 and 312, described above, have been carried out, a determination is made at 313 if a cookie (e.g. security cookie) value was included (e.g. sent back to the web server from the storage 440 of the browser) in the request. If not, an HTML page "body" is built reporting an anomalous condition (314) most likely caused by a user having saved an old AUTHENTICATE CGI URL as a bookmark, and replaying it back to the web server much later before properly trying to authenticate via the GETPAGE CGI. A standard HTTP header is constructed (323). The header and body can be built in any order, and are transmitted to the client/browser (324).

If, however, a cookie value was transmitted with the request, the user name and password is authenticated by comparison against the data statically stored in the TSB registry. If the comparison is not successful, as determined at 316, the process branches to 317 to build an HTML body indicating a failed logon and a message for retry, preferably in the form of a hypertext link to re-enter the Getpage process of FIG. 2.

If the authentication has been successful, the user is informed and provided with a link to continue (411 of FIG. 4) and it is determined at 318 if an entry for the security cookie value exists in dynamic cookie mapping store 460. This will generally be the case if the Authenticate process was preceded by an initial Getpage request in preceding steps 231, 232 of FIG. 2. If the mapping does not exist, an HTML "body" is built, reporting an anomalous condition (319) most likely caused by a user having saved an old AUTHENTICATE CGI URL as a bookmark, and replaying it back to the web server much later before properly trying to authenticate via the GETPAGE CGI. A standard HTTP header is constructed (323). The header and body can be built in any order, and are transmitted to the client/browser (324).

If dynamic mapping does exist, user credentials are obtained from the TSB registry as a function of the supplied user name. The user name and credentials are associated with the security cookie value and the identification of the requested HTML page is obtained from dynamic mapping memory 460. If the "shortcut" option was configured to be off, a "body" is built to tell the user that authentication was successful. A hypertext link to the GETPAGE CGI is included, so that when the user gets the reply, the user must click the hypertext link to receive the first filtered page (321). If the "shortcut" option is configured to be on, this intermediate reply is skipped, and the filtered data is sent immediately (322). The logic of 322 in FIG. 3 and the logic of 223 in FIG. 2 are the same. When the shortcut is on, a user that sees filtered data immediately after having supplied authentication data knows the logon succeeded, otherwise an error panel would have been returned instead.

To recapitulate with reference to FIG. 4, a user makes a request 401 to the invention to retrieve a filtered page. When the client as yet has no valid cookie, the invention detects this, assigns a random cookie value, and adds a new entry to the dynamic mappings with this value as a lookup key, and maps the requested HTML page (410) to this value. The reply sent back to the browser (403) is a web form requesting the user type authentication information. This reply also includes the "set cookie" operation that endows the browser with the cookie value.

When the form is returned (405) with the user name, cookie value and password in the next request, the user name and password can then be compared against registered user information statically stored in the TSB registry in the performance of step 315 and retrieved as indicated at 408 in response to detection of a cookie value (406). The comparison is typically one based on cryptological methods if authentication is password based, as indicated at 407. After a successful authentication, the other fields of the dynamic mapping are established (409) including the user name and the credentials data retrieved from the registry. This effectively establishes the "security cookies". The originally requested page is obtained from the cookie mapping (410), and as shown in the diagram, used to fill a hypertext link in the browser reply (411), which illustrates the scenario where the shortcut option is configured to be off. If the user clicks the hypertext link, this results in a GETPAGE request (412), which like all subsequent requests includes the cookie information established earlier under 403.

This invocation of GETPAGE detects the existence of the cookie value within dynamic mappings, and can thus infer that the user has already performed the authentication process, through the fact that the browser is capable of supplying a valid known cookie value. GETPAGE thus retrieves the credentials information from the mappings (413), retrieves the HTML file specified in the URL, filtering it in accordance with whether the user's credentials are sufficient to be allowed access to the HTML page, or any fine-grained portion thereof, and adding other items to the HTML such as images and headers, and returns this filtered reply back to the browser (414), as will now be discussed in detail.

Returning now to FIG. 2, after the identification of the requested HTML page has been read from dynamic mapping memory as shown at 221 (410 in FIG. 4), a standard HTTP header is built as shown at 222 and the requested HTML body corresponding to the requested HTML page is constructed. In addition to construction of a TSB header and optional footer and hypertext links to other CGI scripts (such as for password change, logout and other secure CGI scripts in accordance with the invention which will be described below), the requested HTML page is read off disk and scanned for fine-grained and page security labels.

If a page security label is found, the label is compared with the user's mapped credentials. If the page security label exceeds the authorization indicated by the user's credentials, an "access denied" page is constructed and returned to the client/browser. Otherwise, the user's credential is compared against fine grained security labels of the form:

```
<seclabel LABEL> [other HTML constructs]
</seclabel>
```
where LABEL is a string representation of the fine grained label (e.g., in a DAC access policy, it might be an access control list like "engineer:rw, finance:r", and in a MAC access policy, it might be "TopSecret/Nato".) The "[other HTML constructs]" between any <seclabel> and </seclabel> pair define the HTML data the label protects. The preferred form of the invention does not support nesting of labels; in fact, the invention deems a file to be mislabeled and, hence, not retrievable to browsers under any circumstances if it encounters two <seclabel> structures without an intervening </seclabel>, or vice versa. Nevertheless, as can be appreciated, imbedding of such fine-grained label constructs allows great latitude in controlling access to portions of a single, static HTML page, even without nesting, which would greatly complicate the filtering algorithms.

Data in the HTML page can thus be filtered against the user's credentials and only data and links to which access is authorized is presented to the user as depicted at 223. In the same process, hypertext links to which the user is granted access are converted to an appropriate Getpage CGI function. For example, the invention allows the WebMaster or other web administrator to create these secured web pages such that if a hypertext link refers to another user selectable secured page, the web administrator simply provides the relative name, and the invention converts the hypertext link to an appropriate Getpage CGI URL name format during the filtering process. Note that just because the user has access to the hypertext link in one filtered page does not guarantee anything in regard to whether or how much access a user has to a page that the user chooses to retrieve via clicking the hypertext link. This filtering process is considered to be the principal function of the trusted services broker (TBS) in accordance with the invention.

However, to provide a preferred environment for the user and for manipulations or operations using other CGI scripts in accordance with the invention and which will be described below, it is preferred as a perfecting feature of the invention to provide unobtrusive marks (e.g. small graphical image file (GIF) images such as low contrast dots in a display) of the text at the location in the text of any view able fine-grained labeled data (e.g. at the location of the HTML label structure), one image denoting the start of the labeled data, and another image denoting its end. The starting GIF image may be clicked to invoke another CGI function to view the label contents.

More specifically, additional CGI scripts are preferably provided to allow the user, if authorized, to view or change passwords, security labeling, credentials and to perform a logout. These controls are preferably presented, to the extent authorized to a particular user, within a so-called TSB header, or header and footer, that are placed before and after the filtered HTML data. A logout CGI script would be of particular value if the web browser machine were open to the public, and the web browser left running as multiple people used the system in turn. Labeling CGI scripts are important if it is important to let people see the label value of fine-grained sections for which they have access, and to perhaps change those labels within the access control rules. Credential CGI scripts are important if the access policy grants the user a range of potential values, which can be changed, perhaps to satisfy a "least privilege" policy. Password CGI scripts are almost always important since it is generally important for users to change passwords on occasion.

Figure 5:
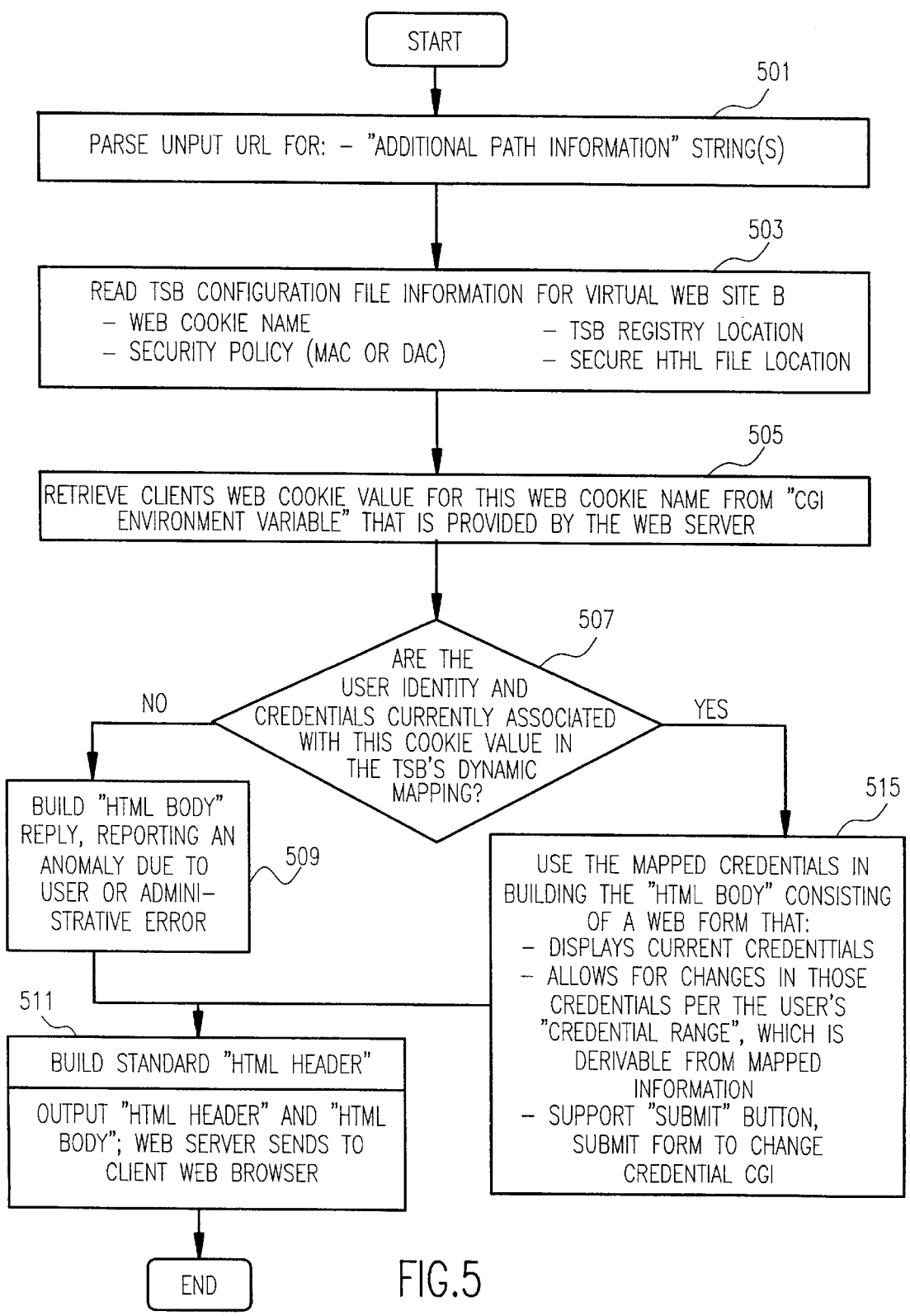
FIG. 5 is a flow chart/high-level block diagram of the View Credentials function in accordance with the invention.

Referring now to FIG. 5, the View Credentials CGI script will now be discussed. The purpose of this CGI script is to allow the user to display current credentials corresponding to the current level of access. The user may wish to alter the level of access authorization at which the system is accessed in view of the current need to know and/or other circumstances such as the presence of other persons. No parameters are required for this CGI script since the user's credentials, for which the security cookie is a surrogate, is sufficient to the retrieval of a suitable form or menu.

Specifically, like the Get page and Authenticate security CGI discussed above, the View Credentials CGI begins by parsing the URL for additional path information 501 and reading the TSB Configuration file for a location (e.g. Ea virtual web site) for a web cookie name, TSB registry location, secure HTML file location and security policy (MAC or DAC) at 503. Then, cookies are obtained by reading the CGI environment variable setup by the web server (505). If the web cookie name is not found, or if the value associated with the cookie is not mapped to any user credentials within the dynamic mappings, then an anomaly message is built and transmitted with a standard HTTP header as indicated at 509, 511. If the mapping exists, the CGI builds a web form displaying the user's current credentials. The form is built to allow the user to submit changes to the credentials within their allowed range. The "submit" button (or any similar interface) is built so that if clicked or otherwise selected, the Change Credential CGI would be invoked. These operations are also depicted in data flow segments 901–903 of FIG. 9.

Figure 6A:
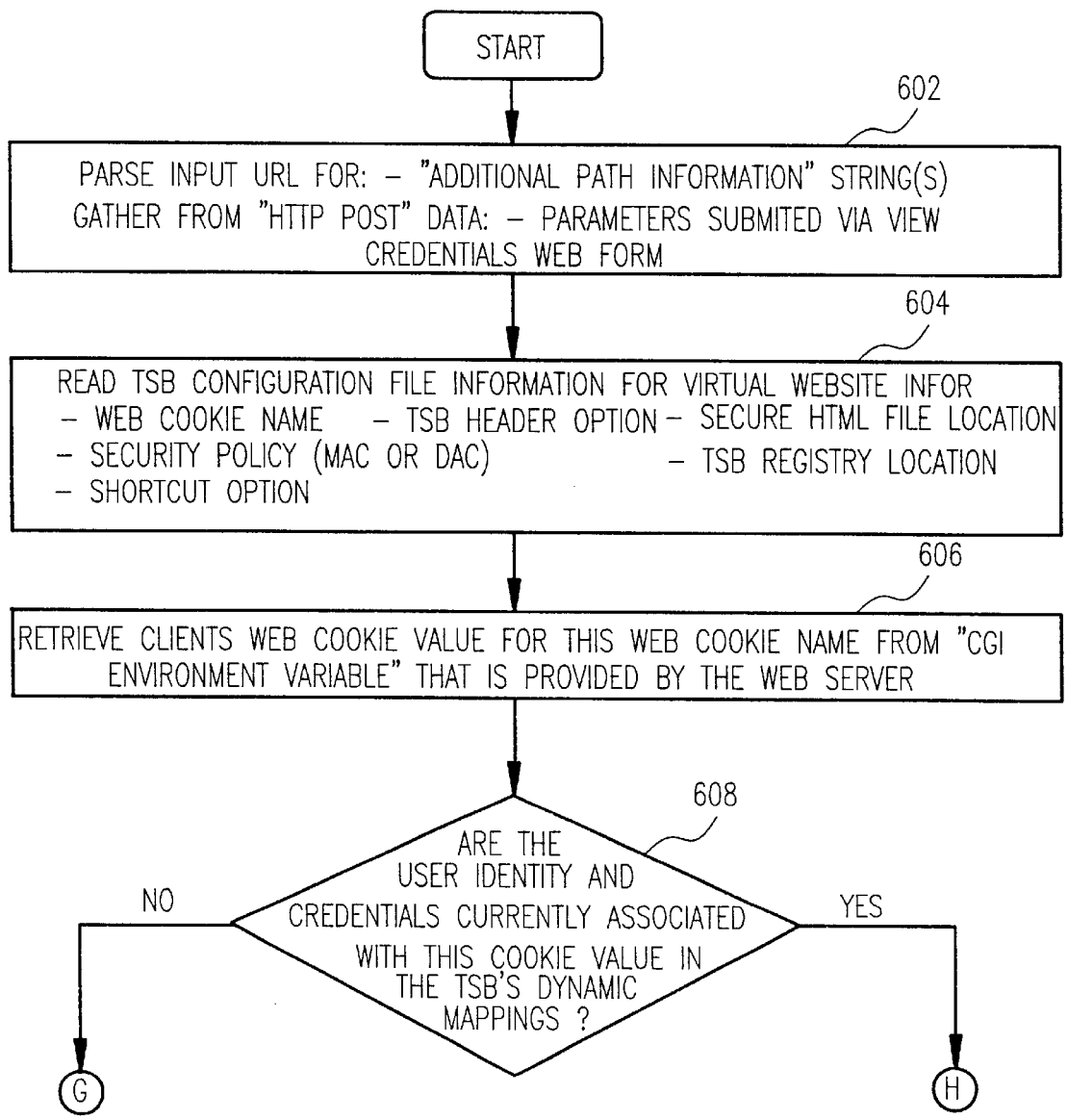
FIG. 6 is a flow chart/high-level block diagram of the Change Credentials function in accordance with the invention.
Figure 6:
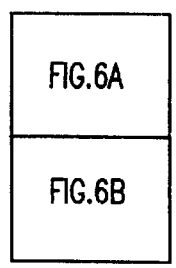
Figure 6B:
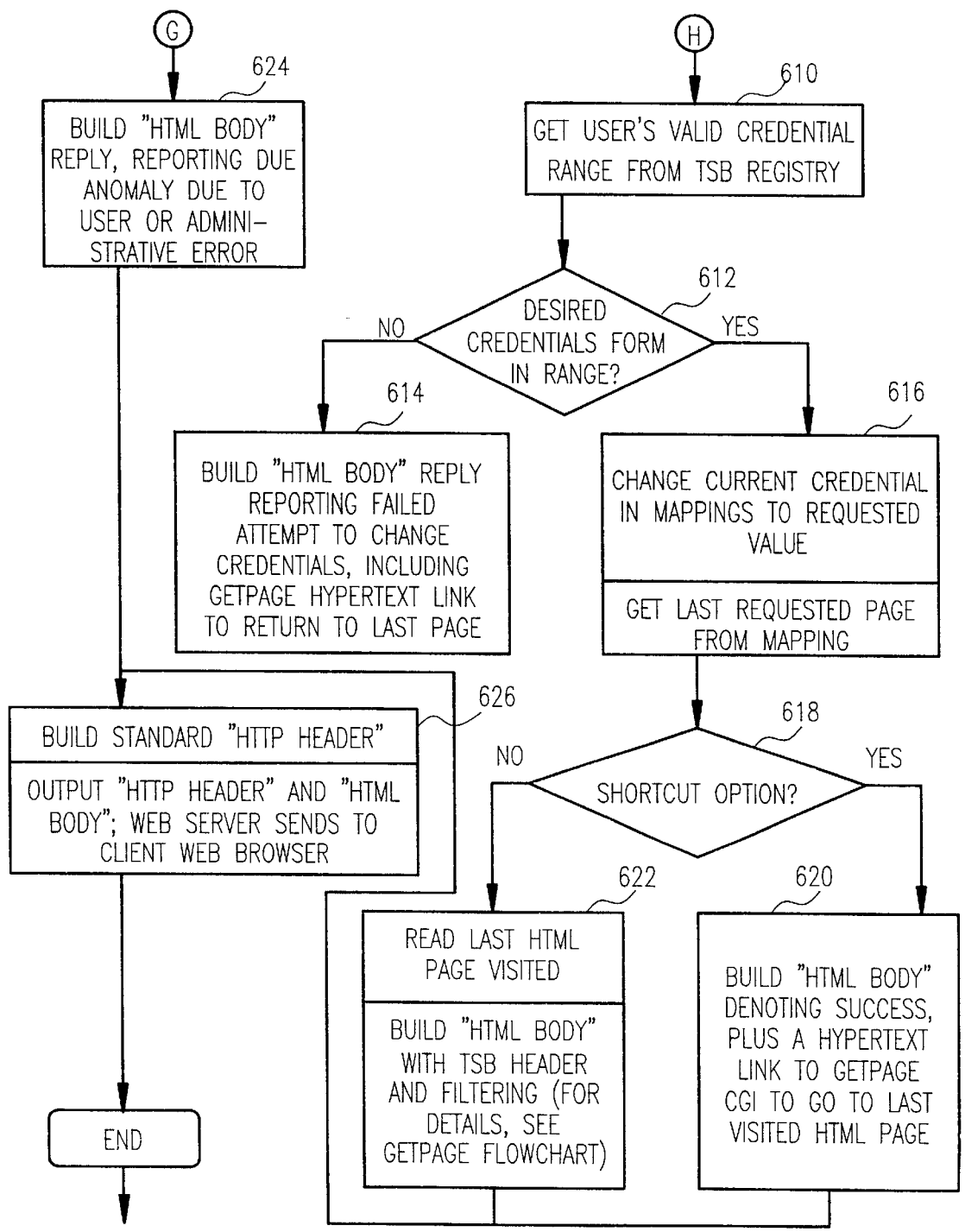

Referring now to FIG. 6, the Change Credential security CGI will now be discussed. This program executes the "submit" option for making changes in the credentials discussed above.

Steps 602 and 604 are similar to steps 501 and 503 of FIG. 5 except that different and additional information is received. More specifically, since the View credentials process of FIG. 5 is invoked via a hypertext link (depicted at 901 of FIG. 9), only the additional path information string transmitted in response to a hypertext link selection is necessary to invoke the process at 501 whereas the Change Credential process is invoked as the result of submitting a form, so it obtains form parameters received per the "HTTP POST" protocol (602) as well as having the additional path information from the URL. Change Credential obtains more information from the configuration file, namely the shortcut option and TSB header options (604). Steps 606, 608, 610 and 612 exactly correspond to steps 505, 507, 509 and 511 of FIG. 5.

If the user identity and credentials are currently associated with the security cookie retrieved at 606, as determined at 608 (905 of FIG. 9), the user's valid credential range is retrieved (610) from the static TSB registry 470 as depicted at 906 of FIG. 9. The altered credentials from the web form transmitted by the client/browser are compared with the user's authorized credential range at 612. If the submitted change is not within the authorized credential range, an HTML body message is built 614 to inform the user that the submitted change is disallowed. This message preferably also includes a Getpage hypertext link to allow return to the last page previously viewed.

If the submitted change is within the user's credential range, as determined at 612, the current credential is changed in dynamic mapping memory 460 as depicted at 616 of FIG. 6 and 907 of FIG. 9. The identity and location of the data in the last displayed page is retrieved from dynamic mapping memory 460 as depicted at 908 of FIG. 9.

Then, preferably, the process behaves according to a configurable "shortcut" option. If the shortcut is "off", the HTML body built in 620 is a message indicating a successful credential change, including a hypertext link to GETPAGE, which the user can click to get back to the previously visited filtered page (which will now be filtered differently per the changed user credentials.) If the shortcut is "on", box 622 will behave like box 224 of FIG. 2, reading the previously access HTML file, performing label filtering and the other label imaging and TSB header supports, the result being that after a successful change of credentials, the user is immediately given back the last page viewed, this time filtered with the new credentials. The change credential security CGI is completed, in either case, by building a standard HTTP header and transmission of the header and HTML body to the client/browser.

Figure 7:
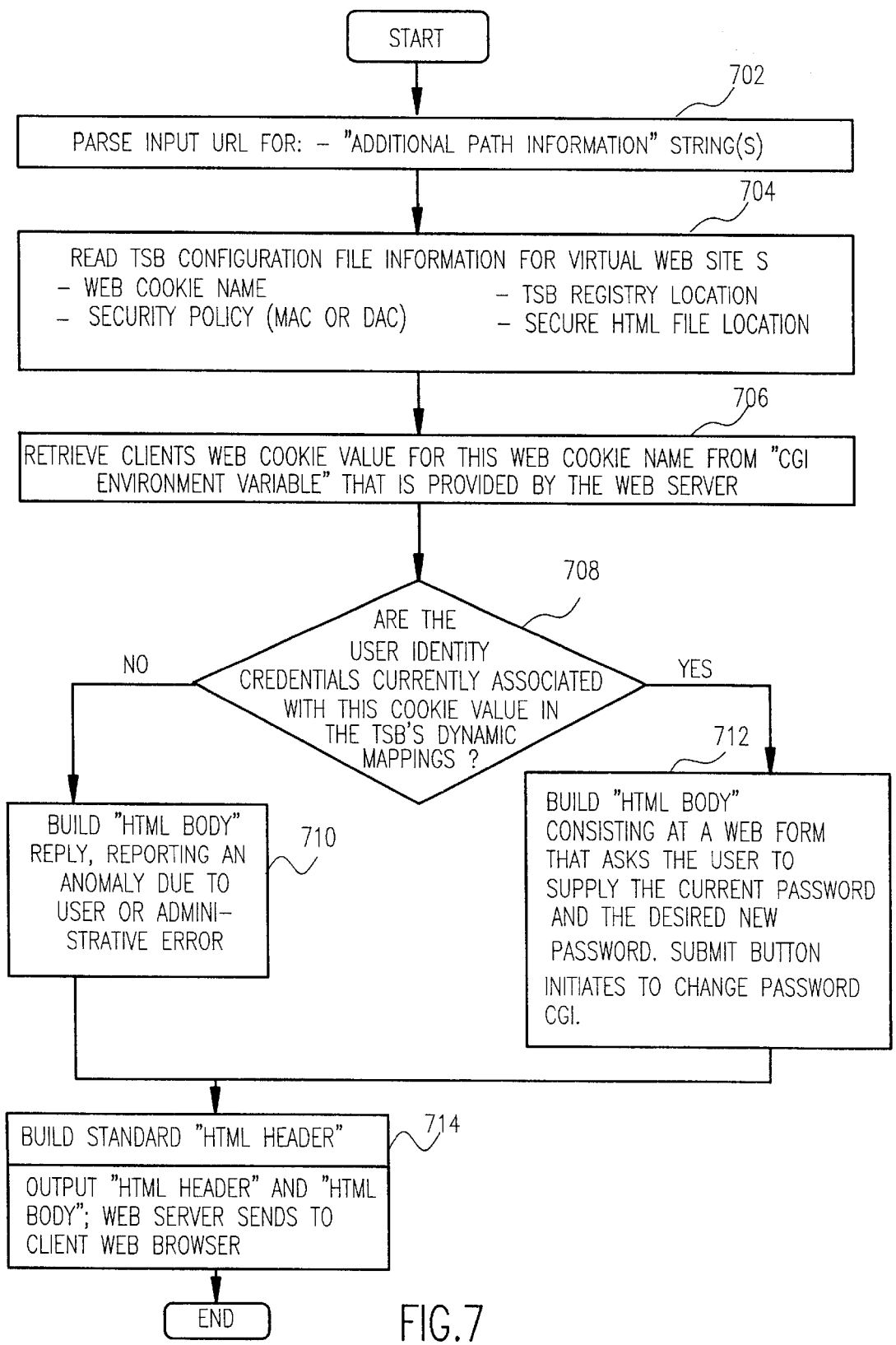
FIG. 7 is a flow chart/high-level block diagram of the password form function in accordance with the invention.

Referring now to FIG. 7, the Password Form CGI will now be discussed. This CGI, along with the Change Password CGI of FIG. 8, allow users to periodically change their passwords, as stored and managed by the CGI within the TSB registry (item 470 in FIG. 4.) These CGI provide the ability to change a password via web forms, with a similar look-and-feel to the other web forms in support of labels and credentials that other CIGs of the invention support.

As with other security CGI provided in accordance with the invention, the URL is parsed for additional path information (702) identifying a request for a security CGI and the TSB. Configuration is read, including the cookie name, TSB registry location, secure HTML file location and security policy, as depicted at 704. The client's cookie value for that cookie name, transmitted with the CGI request (910) as a CGI environment variable is then retrieved and a determination is made if a user identity and credentials are associated with the cookie value in the dynamic mapping memory 460 as illustrated at 708 of FIG. 7 and 911 of FIG. 9.

Figure 8:
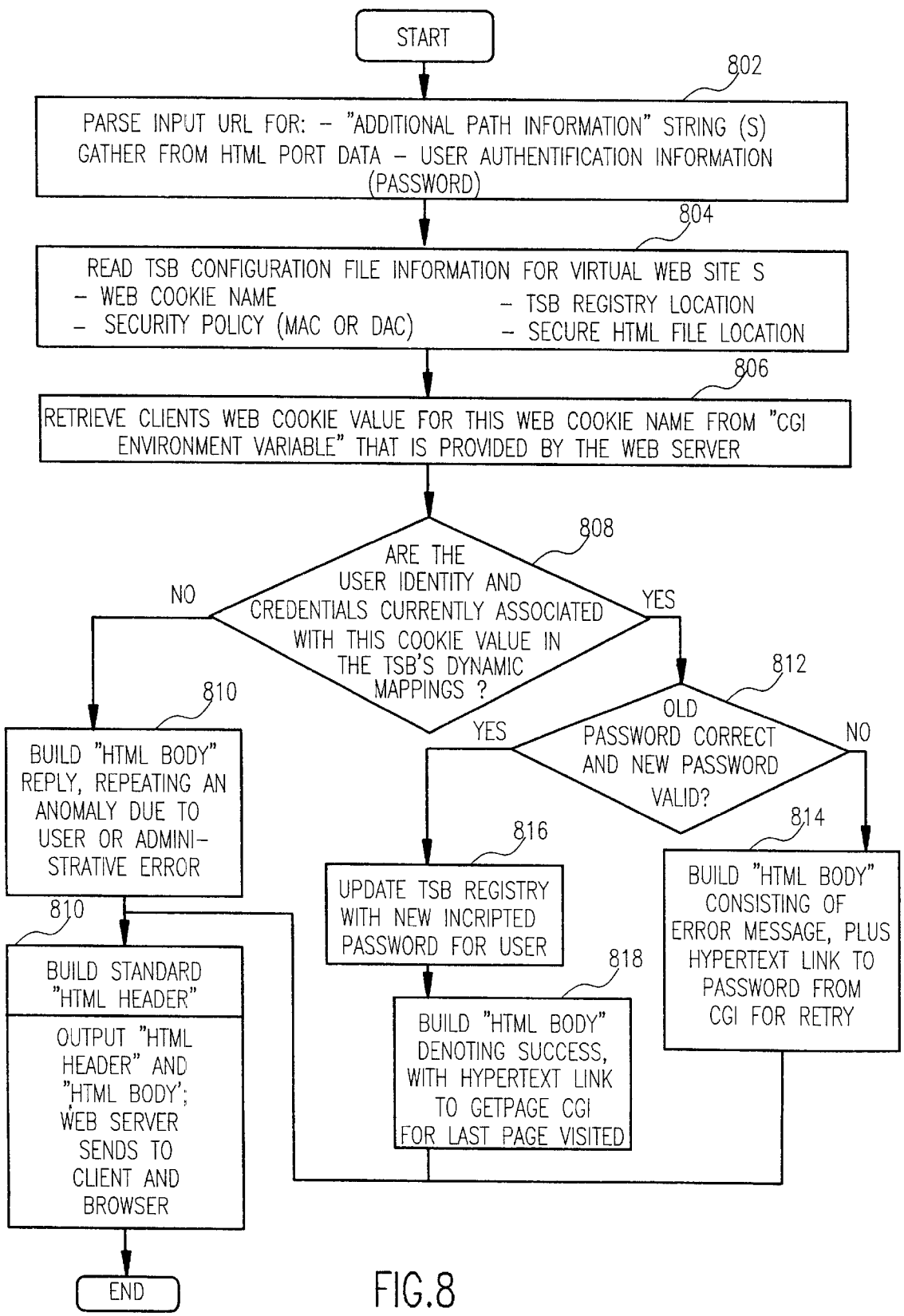
FIG. 8 is a flow chart/high-level block diagram of the Change Password function in accordance with the invention.

As in security CGI discussed above, if no mapping is found, an HTML body message is built (710) to inform the user of an anomaly, failure, administrative error or the like, a standard HTTP header is also built and the header and body sent to the client/browser (714, 912). If the mapping is found to exist, an HTML body is built including a web form asking the user to supply a new password at 712 and transmitted with a standard HTTP header as also depicted at 714 and 912. The "submit" button of the web form is built so that if clicked, the Change Password CGI would be invoked, as represented in FIG. 8.

In much the same manner as the View credential and Change credential CGI discussed above, step 802 of the Change password CGI is the same as step 702 of the password form CGI of FIG. 7, except that a new password is received via the "HTTP POST" protocol here (802). Note that if a user typed the new password information but did not submit the form, then this Change Password CGI would not be invoked. The user could have simply hit the "Back" button of the web browser to cancel any attempt to change password. Steps 804, 806 808, 810 and 820 are identical to the corresponding steps of the password form CGI described above and provide a reply to the client/browser including a hypertext Getpage link to continue if the mapping of credentials with the security cookie value (detected at 914 of FIG. 9) is not found.

If the mapping is found at 808, it is determined at 812, 915 if the old password cryptographically matches the value known in the registry, and the new password is valid. (A preferred embodiment of the invention would make checks on the new password such as minimum length, does not equal the previous password, contains a number, etc.). If not, an error message with a hypertext link to retry is built at 814 and transmitted with a standard HTTP header at 820. If the tests of step 812 are successful, the TSB registry 470 is updated with the new (encrypted) password (816, 916) and an HTML body message denoting success and a hypertext Get page link is built at 818 and transmitted at 820, 918. For Change Password, explicit visibility as to a successful change is deemed important enough so as to effectively cause the logic to act as if the shortcut option were "off". Hence, the last requested HTML page is retrieved from the mappings (917), and an HTML body built in 818 is a message indicating a successful password change, include a hypertext link to GETPAGE, which the user can click to get back to the previously visited filtered page.

Figure 10A:
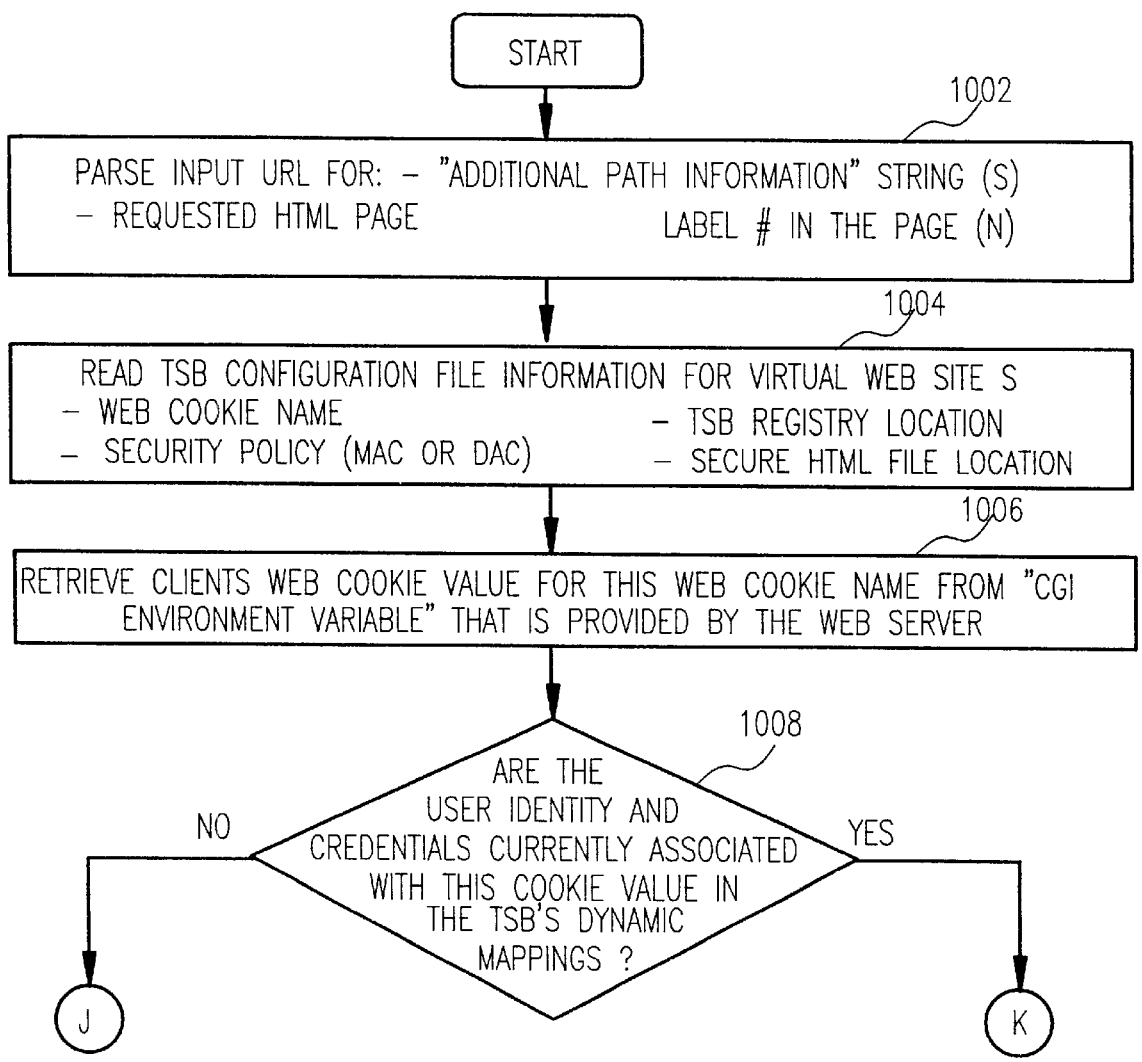
FIG. 10 is a flow chart/high-level block diagram of the View Label function in accordance with the invention.
Figure 10:
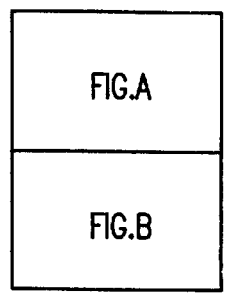
Figure 10B:
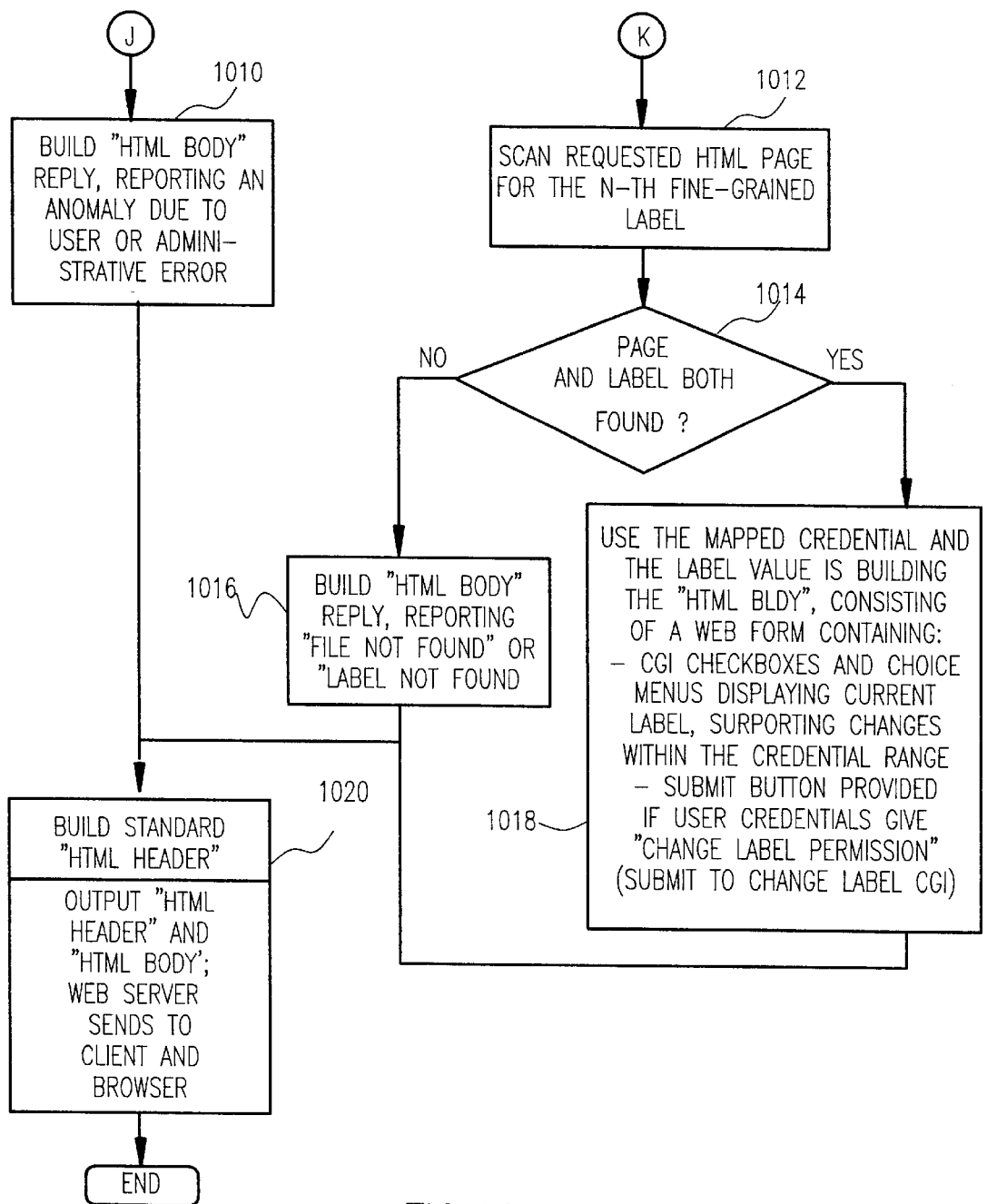
Figure 11A:
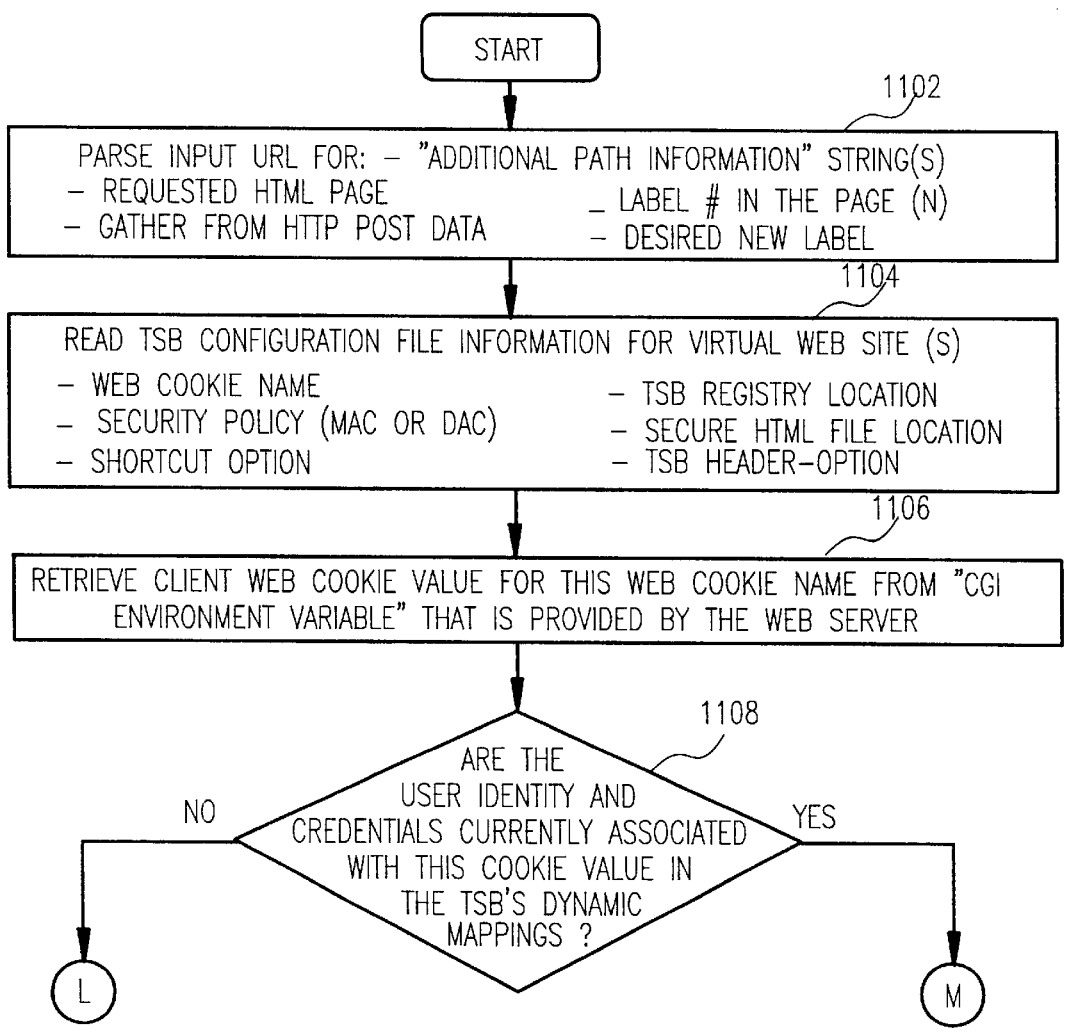
FIG. 11 is a flow chart/high-level block diagram of the Change Label function in accordance with the invention.
Figure 11:
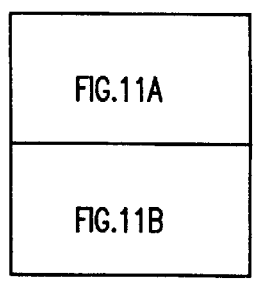
Figure 11B:
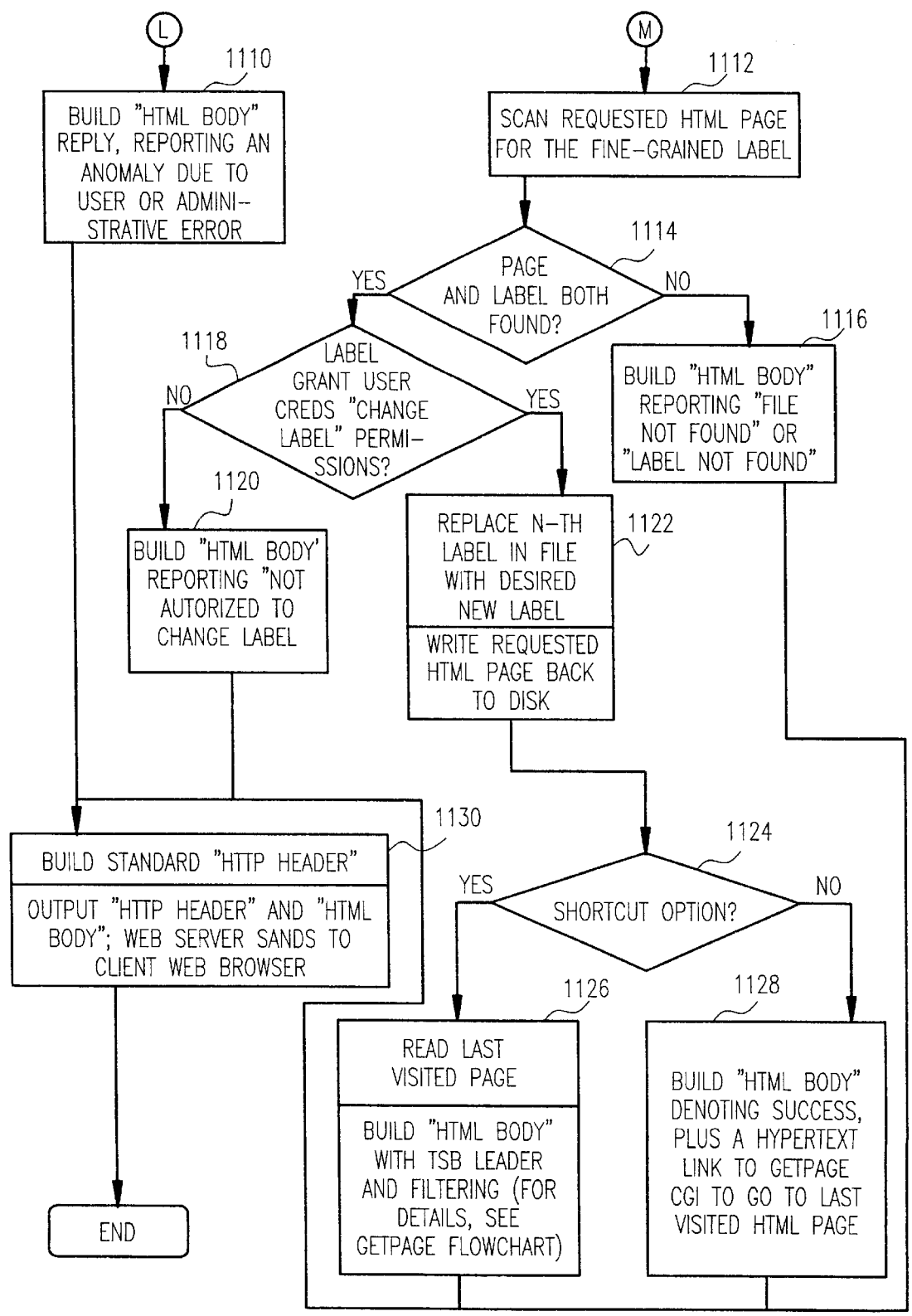
Figure 12:
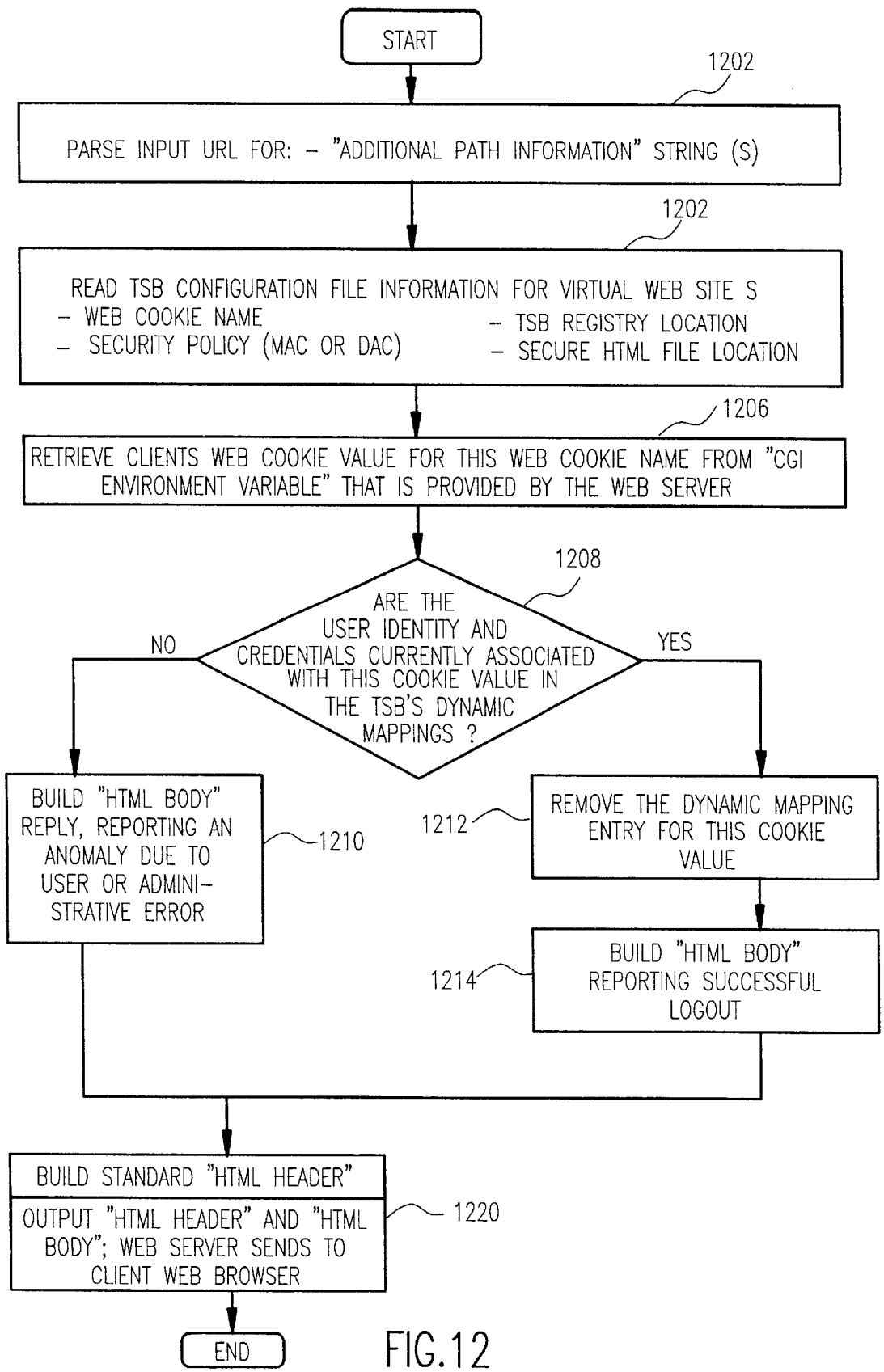
FIG. 12 is a flow chart/high-level block diagram of the Logout function in accordance with the invention.

The View label, Change label and Logout security CGI are illustrated at FIGS. 10, 11 and 12 respectively and the data flow for these processes is depicted in FIG. 13 in the same manner as for other security CGI discussed above. The View label and Change label security CGI allow the manipulation of security labels within a secure HTML page at a fine-grained level. These two CGI scripts perform an analogous function for security labels as the View credentials and Change credentials CGI performed for credential manipulation discussed above. However, these two CGI scripts functionally differ from other security CGI discussed above by being related to specific textual data that is displayed at particular locations withing the filtered HTML page. Therefore, selection of any particular item is preferably done graphically with a cursor and a cursor control device such as a mouse, light pen, trackball, touchpad or the like in a manner well-understood in the art.

Referring now to FIG. 10, the View Label CGI is preferably invoked by selection of a location in a text string such as by "clicking" (1301) on a location in a display of text, images, and the like. This action can, for example, be invoked by having the filtered page contain small GIF images placed wherever viewable fine-grained labels appear in the HTML, and assigning a hypertext link reference to them, such that if a user clicks on any such image, it invokes the View Label CGI function, along with URL parameters that identify which page is being referenced, along with which label, identified by a number understood by the CGI scripts, within the HTML page which is to be viewed.

The View label security CGI request begins by parsing the URL for additional path information in step 1002. The virtual web site is determined from the extrapath information in the URL which determines the TSB. congiguration file for reading other parameters including the web cookie name, TSB registry location, secure HTML file location and security policy, as depicted at 1004. The client's security cookie value sent with the URL is retrieved at 1006 and the existence of corresponding mapping is detected at 1008, as before. Similarly to other CGI described above, if such mapping is not found, an HTML body message is built at 1010 and returned with a header including a hypertext link at 1020.

If the mapping is found, the HTML page is scanned for the selected label number as shown at 1012, 1302 and, if the page and label are not both found, an HTML message body is built indicating "file not found", "label not found" or the like at 1016 and transmitted with a standard HTTP header at 1020. If the page and label number are both found (1303), the mapped credential range and label value are retrieved (1304) and used to build an HTML body consisting of a web form, that displays the current label via checkboxes and choice menus, such that the choices available but not selected are within the user's credential range. I.e., the form is built to allow the user to submit changes to the label within the user's valid range. The "submit" button is built so that if clicked, the Change Label CGI would be invoked.

As with other security CGI discussed above, the Change label security CGI in accordance with the invention, illustrated in FIG. 11, is executed upon activation of the "submit" arrangement (1306). Again, steps 1102–1116 and 1130 are identical to corresponding process steps 1002–1016 and 1020 of FIG. 10 except that the desired new label is captured at 1102 and shortcut and TSB. Header options are read at 1104. If the mapping for the security cookie is found at 1108, 1307 and both the page and label are found at 1114, 1308, it is determined at 1118, 1309 whether or not the user is granted "change label permission for that label. (The change label permission is determined according to the access policy in force. For a DAC policy, there should be a unique permission bit in the ACL-style label to denote it. A MAC policy can allow a label change as long as the current label is within the user's valid MAC range, or, the MAC policy might mark users as having upgrade/downgrade privilege.) If not, an HTML body message is built at 1120 indicating that change label permission is not authorized and the message is transmitted with a HTTP header at 1130.

If Change label permission is authorized, the selected label number is replaced (1110, 1310) with the new label and the HTML page is rewritten to disk. The Change label process concludes with steps 1124–1128 including execution of a shortcut option branch (both branches including filtering for redisplay 1311 of the last HTML page) such as those of FIGS. 3 and 6 which need not be discussed further.

Referring now to FIG. 12, the Logout security CGI will be discussed. This CGI script is preferably invoked by a selection from the TSB header and serves to delete the client's cookie value from the server's dynamic mappings (1212, 1315) and can do so without termination of the browser. (After a logout, the client still has the cookie whose value has been deleted but the cookie is no longer recognized by the server.) This is particularly useful, as alluded to above, when the same terminal and/or browser is to be used in rapid succession by different users where termination of the browser to destroy the security cookie would be unacceptably time-consuming. Steps 1202–1210 and 1220 are similar to corresponding steps in the flow charts for CGI scripts shown in, for example, FIG. 7 or 10 and need not be further discussed. If the mapping for the security cookie value is found (1314) at 1208, it is removed at 1212 (1315) and an appropriate HTML body message is built at 1214 and transmitted (1316) with an HTTP header.

In summary, of the above discussion, the invention provides flexible, fine-grained security to the level of a data or HTML element (e.g. word, number, image, hypertext link and the like) in a manner compatible with Internet protocols and procedures by providing a secure but easily used mechanism for establishing a security cookie as a surrogate credential for a single session (and destroying the security cookie by logout or browser termination) under the control of a CGI function that authenticates users according to a registry that defines users and their valid credentials. Labeled HTML files are secured by the articulation of memory as established by the configuration file (e.g. such as forming a virtual web site) such that secured HTML files, plus any configuration files or registry files used by a "virtual web site", are only accessible through the inventions' CGI scripts and not accessible by the native web server software.

The security CGI scripts are invokable by the web server, but cannot be altered in any way by the web server. However, as with all software that enforces security, administrative care must be taken so that only those humans endowed with trusted administrative authority have the ability to access these entities directly, such as for installation and maintenance. Fine grained security as well as accommodation of different security policies (e.g. MAC and/or DAC) is realized by filtering the HTML page in accordance with dynamically stored credentials while building an HTML body message for transmission.

Once a randomly assigned cookie value has been assigned to a client/browser, access to secured information (filtered in accordance with access credentials) continues for the duration of the session until the cookie is destroyed by logout or browser termination in a manner substantially transparent to the user. The system in accordance with the invention need only be installed at the web server and enhances browser and server functions by allowing different security policies for any given virtual web site, imbedding of fine-grained security labels and alteration of passwords and credentials to be supported.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of limiting access to information stored in HTML files on a fine-grained basis and independent of HTML contents, accessible by a web server through a CGI script, according to security label constructs imbedded within web-server stored HTML, said information comprising a definition of HTML label structures recognizable by said CGI script, said method comprising steps of dynamically storing at said web server a mapping of a web cookie value to user credentials retrieved from CGI accessible registry storage, thereby establishing said web cookie as a security cookie in said mapping, creating a set of said credentials by prompting a user for authentication information, validating said authentication information against user information retrieved from said CGI accessible registry storage, performed in response to a request for retrieval of a stored HTML file that was not accompanied by a recognized web cookie name and value as contained within said mapping, retrieving said stored HTML file in response to a request from a user accompanied by said security cookie value, filtering said stored HTML file with said CGI scripts as a function of security label constructs embedded in the HTML file in accordance with a comparison to said user credentials associated with said security cookie value to form filtered information in the form of standard HTML in accordance with said HTML label structures, and returning said filtered information to said user.

2. A method as recited in claim 1, including the further steps of supporting credential formats corresponding to any of a plurality of modes of access control with a definition within CGI accessible registry storage, storing credential information in forms which support said CGI accessible registry storage definitions, and providing said HTML security label structures which correspond to said CGI accessible registry storage definitions.

3. A method as recited in claim 2, wherein said credential formats include a discretionary access control mode and a mandatory access control mode for defining user credentials and HTML embedded security labels.

4. A method as recited in claim 1, wherein said HTML label structure identifies text within said HTML file and provides authorization control for access and alteration of the HTML label structure by the user.

5. A method as recited in claim 1, wherein said HTML security label structure includes a coarse-grained option controlling access to the entire HTML file.

6. A method as recited in claim 1, wherein said web cookie value is set without specification of a lifetime of said web cookie value, whereby said web cookie value is destroyed upon termination of a web session in which it is set.

7. A method as recited in claim 1, wherein said request including said security cookie is encrypted.

8. A method as recited in claim 1, including the further step of adding function information to said filtered information to be sent to said user.

9. A method as recited in claim 8, wherein said function information includes a hypertext link to a CGI program which supplies a web HTML form containing current credentials and allows change of said current credentials.

10. A method as recited in claim 8, wherein said function information includes a hypertext link to a CGI program which supplies a web HTML form which allows change of user password of said user.

11. A method as recited in claim 8, wherein said function information includes a hypertext link to a CGI program which provides a logout function.

12. A method as recited in claim 8, wherein said function information includes image information indicating the location of a label in text of said HTML file.

13. A method as recited in claim 8, wherein said function information includes a hypertext link to a CGI program which allows change of said HTML label structures in accordance with user credentials.

14. A method as recited in claim 1, wherein said CGI scripts convert HTML hypertext links to a CGI format to the web client and wherein said filtering step includes the further step of converting said hypertext link to a CGI URL upon selection of said hypertext link by a user to invoke further CGI filtering functions such that accessing other HTML though such hypertext links will be subject to the same CGI script security label filtering mechanism, whereby a web administrator may include non-CGI hypertext links within the security labelled HTML.

15. A method as recited in claim 1, including the further step of validating user passwords using cryptographic password representations within said CGI accesssible registry.

16. A method as recited in claim 1, wherein said CGI scripts are configurable to return enhanced information to the user, said enhanced information including an indication of label existence and icon-visible hypertext links allowing view or change of label information in the web page in accordance with user credentials.

17. A method as recited in claim 8, wherein said CGI scripts are configurable to return enhanced information to the user, said enhanced information including an indication of label existence and icon-visible hypertext links allowing view or change of label information in the web page in accordance with user credentials.

* * * * *